(12) United States Patent
Lu

(10) Patent No.: US 10,835,938 B1
(45) Date of Patent: Nov. 17, 2020

(54) SYSTEM AND METHOD FOR RAPID RECLAMATION OF SALINE-SODIC AND HEAVY METAL CONTAMINATED SOILS

(71) Applicant: James Cheng-Shyong Lu, Huntington Beach, CA (US)

(72) Inventor: James Cheng-Shyong Lu, Huntington Beach, CA (US)

(*) Notice: Subject to any disclaimer, the term of this patent is extended or adjusted under 35 U.S.C. 154(b) by 0 days.

(21) Appl. No.: 16/573,976

(22) Filed: Sep. 17, 2019

(51) Int. Cl.
*B09C 1/00* (2006.01)
*B09C 1/02* (2006.01)
*B09C 1/08* (2006.01)

(52) U.S. Cl.
CPC .............. *B09C 1/02* (2013.01); *B09C 1/002* (2013.01); *B09C 1/085* (2013.01)

(58) Field of Classification Search
CPC .............. B09C 1/085; B09C 1/02; B09C 1/08
See application file for complete search history.

(56) References Cited

U.S. PATENT DOCUMENTS

| | | | |
|---|---|---|---|
| 4,687,505 A | 8/1987 | Sylling et al. | |
| 4,755,206 A | 7/1988 | Clark | |
| 4,923,500 A | 5/1990 | Sylling et al. | |
| 5,074,986 A | 12/1991 | Probstein et al. | |
| 5,106,406 A | 4/1992 | Sylling et al. | |
| 5,398,756 A | 3/1995 | Brodsky et al. | |
| 5,405,509 A * | 4/1995 | Lomasney .............. | B01J 47/08 204/515 |
| 5,712,224 A | 1/1998 | Boyd et al. | |
| 5,725,752 A | 3/1998 | Sunderland et al. | |
| 6,193,867 B1 * | 2/2001 | Hitchens ................ | B01D 61/56 204/515 |
| 7,759,536 B2 | 7/2010 | Frisky et al. | |
| 8,926,814 B2 * | 1/2015 | He .......................... | B09C 1/02 204/515 |
| 8,968,550 B2 * | 3/2015 | He .......................... | B09C 1/085 205/743 |
| 9,475,106 B2 | 10/2016 | Lundy | |

(Continued)

FOREIGN PATENT DOCUMENTS

WO   WO-2004076084 A1 * 9/2004 ............... B09C 1/00

OTHER PUBLICATIONS

L.E. Allison et al., "Diagnosis and Improvement of Saline and Alkali Soils," USDA Agriculture Handbook No. 60, pp. 1-166 (1954).

(Continued)

*Primary Examiner* — Janine M Kreck
(74) *Attorney, Agent, or Firm* — Mei & Mark LLP; Manni Li

(57) ABSTRACT

Improved in-situ remediation systems which can be used to reclaim contaminated soils impacted by salts, heavy metals, and radionuclides by provision of multiple methods and devices for the contaminated soil remediation including electrokinetic method and devices, leaching solution supply and removal methods and devices, soil negative pressure moisture control method and devices, pressurized leaching/extraction method and devices, and sequential leaching/extraction methods and chemicals for the improvement of the remediation efficiency, enhancement of contaminants migration rates, shortening of remediation period, and prevention of secondary subsurface contamination.

20 Claims, 10 Drawing Sheets

(56) References Cited

U.S. PATENT DOCUMENTS 9,486,844 B2  11/2016  Guo et al.

OTHER PUBLICATIONS

Wikipedia, "Soil Salinity Control," https://en.wikipedia.org/wiki/Soil_salinity_control (printed Sep. 2019).
"In situ treatment technologies for contaminated soil," U.S. Environmental Protection Agency, Engineering forum issue paper, EPA 542/F-06/013, www.epa.gov/tio/tsp, pp. 1-35 (Nov. 2008).
Robert E. Pettit, "Organic Matter, Humus, Humate, Humic Acids, Fulvic Acids and Humin: Their Importance in soil fertility and plant health," Texas A&M University, pp. 1-15 (2008) available at Wikipedia: Cation Exchange Capacity.
"Salt-affected soils and their management," Food and Agriculture Organization of the United Nations, FAO Soils Bulletin 39, pp. 1-128 (1988).
Wikipedia, "Cation-exchange capacity," https://en.wikipedia.org/wiki/Cation-exchange_capacity (printed Sep. 2019).

* cited by examiner

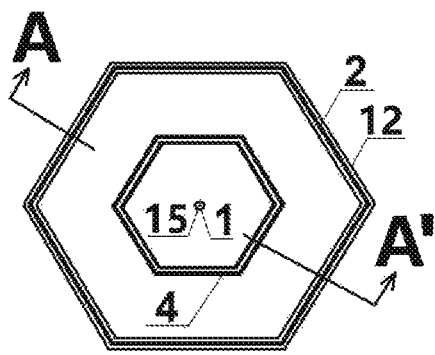
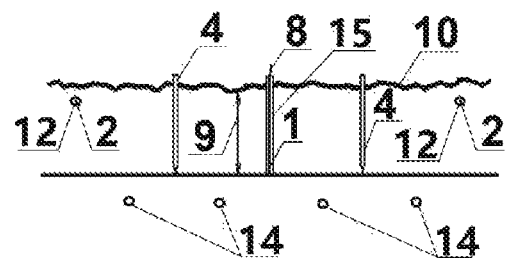
Fig. 1A
Fig. 1B
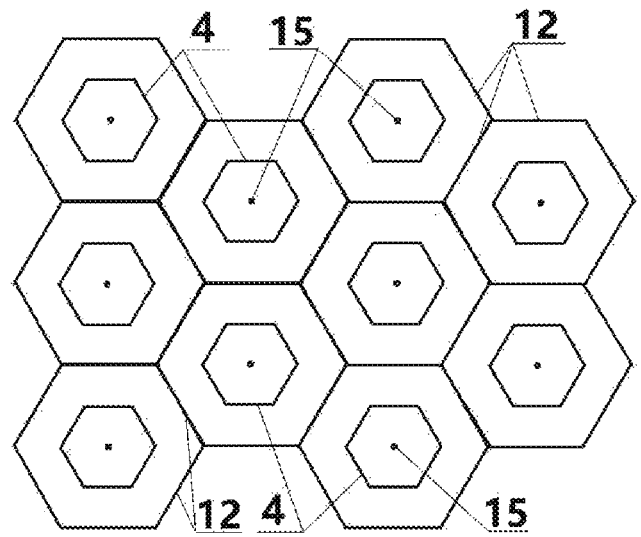
Fig. 1C

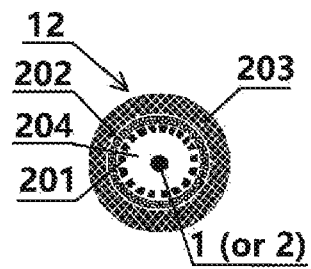
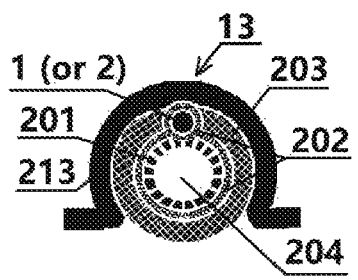
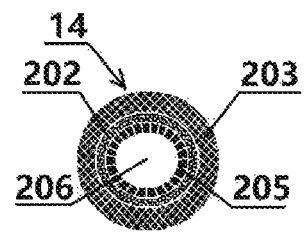
Fig. 2A          Fig. 2B          Fig. 2C
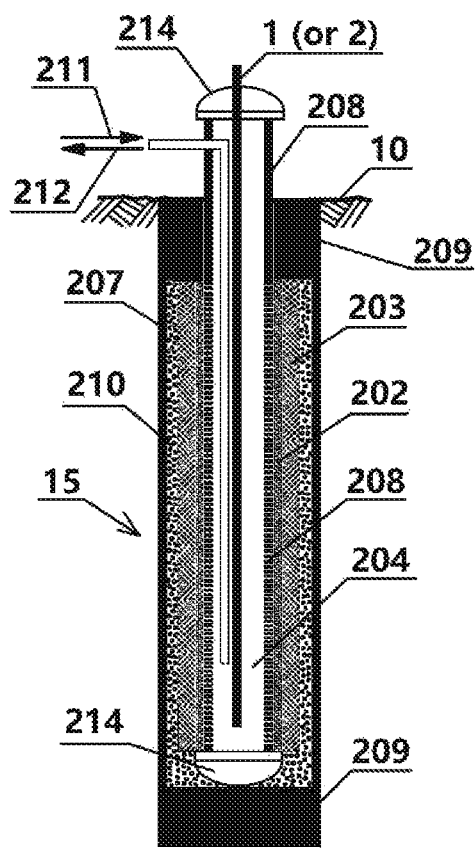
Fig. 2D

SYSTEM AND METHOD FOR RAPID RECLAMATION OF SALINE-SODIC AND HEAVY METAL CONTAMINATED SOILS

BACKGROUND OF THE INVENTION

Field of the Invention

The present invention relates to reclamation of saline-sodic and/or heavy metal contaminated soils, particularly, combination of various unit processes, equipment, and chemicals for rapid reclamation of soils which are slightly, moderately, or severely impacted by salts, and/or heavy metals. The present invention can be applied in arid, semi-arid, and humid regions to greatly enhance the reclamation efficiencies and shorten the lengthy remediation period needed.

Description of the Background Art

Salts, such as chlorides, carbonates, nitrates, and sulfates of sodium, potassium, calcium, and magnesium, may impact soils to the extent that render soils unsuitable for agricultural uses. Salt-affected problems for soils occur in all continents and under almost all climatic conditions. The high salt distribution in soils, however, is relatively more extensive in the arid and semi-arid regions compared to the humid and semi-humid regions. Desalination of soils are necessary when cultivation of a virgin salt-impacted land for agricultural purposes, or reclamation of an existing salt-impacted agricultural area. Effects of salts are mainly in the agricultural fields where plant growth are adversely impacted. Causes of agricultural soil salination problem are particularly in the regions where the irrigation water from river and/or groundwater containing high salt contents and without proper and good drainage conditions. The seriousness of the soil salination problems in the agricultural areas are compounded by high evaporation and low precipitation especially in the arid and semi-arid regions.

Heavy metals, especially any soluble or insoluble species containing cadmium, chromium, copper, iron, mercury, manganese, nickel, lead, zinc, and radionuclides, may contaminate soils causing various health and environmental problems in all types of land uses. Dissimilar to that of salt-affected soils, causes of heavy metal contamination are mainly from improper discharges or spills of materials or wastes containing heavy metals on or into soils. Major sources of heavy metal contamination include discharges or spills from landfills, surface impoundments and waste piles in industrial areas, land treatment areas, underground injection sites, illegal dumping sites, leaks and spills from treatment, storage, transport and chemical process facilities, as well as any related non-point sources such as urban infiltration, agricultural operations, mining activities, and energy exploration operations. Developed and most developing countries have legislation and regulations of cleanup guidelines and requirements for heavy metal impacted soils. Although causes, effects, remediation objectives, and degree of reclamation requirements may be different for soils contaminated between salts and heavy metals, however, reclamation principles, equipment and operation procedures are usually similar, and use of reclamation system can be exchangeable also.

Studies of the soil salinity problems, which are much earlier than that of heavy metals, initiated over a century ago. See USDA: Diagnosis and Improvement of Saline and Alkali Soils, Agriculture Handbook No. 60, 1954. In the course of accumulation of knowledge on the causes, effects, and control methods for salt affected soils, three main groups of soils have been adopted and defined by the USDA (US Department of Agriculture), as shown in Table 1 below:

TABLE 1

Classification of Salt Affected Soils

| Type of Salt Affected Soil | Characteristics* | Definition |
| --- | --- | --- |
| Saline Soils | $ECe > 4.0$ dS/m $ESP < 15$ (or $SAR < 13$) $pH < 8.5$ | Soils that contain sufficient salinity to give ECe Values greater than 4 dS/m, but have an ESP less than 15 (or an SAR less than 13) in the saturation extract. Thus, exchange complex of saline soils is dominated by calcium and magnesium, not sodium. The pH of saline soils is usually below 8.5. Because soluble salts help prevent dispersion of soil colloids, plant growth on saline soils is not generally constrained by poor infiltration, aggregate stability, or aeration. |
| Saline-Sodic Soils | $ECe > 4.0$ dS/m $ESP > 15$ (or $SAR > 13$) $pH < 8.5$ | Soils that have both detrimental levels of neutral soluble salts ($ECe >$ than 4 dS/m) and a high proportion of sodium ions ($ESP >$ than 15 or $SAR >$ than 13) are classified as Saline-Sodic Soils. Plant growth in these soils can be adversely affected by both excess salts and excess sodium levels. |
| Sodic Soils | $ECe < 4.0$ dS/m $ESP > 15$ (or $SAR > 13$) $pH > 8.5$ | Soils that have the most troublesome of the salt-affected soils. While their levels of neutral soluble salts are low ($ECe > 4.0$ dS/m), they have relatively high levels of sodium on the exchange complex (ESP and SAR values are above 15 and 13, respectively). The pH values of sodic soils exceed 8.5, rising to 10 or higher in some cases. |

*Where ECe = Electrical Conductivity of the soil saturation extract; ESP = Exchangeable Sodium Percentage; SAR = Sodium Adsorption Ratio.

As classified by the Wikipedia report (Wikipedia: Soil Salinity Control), soils are considered saline when the $ECe>4$. When $4<ECe<8$, the soil is called slightly saline, when $8<ECe<16$ it is called moderately saline, and when $ECe>16$ severely saline.

Traditionally, reclamation of soils impacted by the above three types of salt-affected soils usually uses the three consecutive operation procedures of irrigation-leaching-drainage, as discussed widely in the open literature. Water is the major agent for the above reclamation method. Salts contain in the agricultural soils involve soluble and insoluble phases. Due to different salt types and their existing soluble and/or solid phases involved, reclamation operation procedures may be the same, but materials/chemicals used for leaching are different. For the removal of soluble salts practiced in the past, no matter what types of salt existed in the soil solution, is usually using flooding/ponding (one of the irrigation methods) of the impacted soils, so the salts can be leached out by the leaching water flowing through the soil pores. Flooding/ponding of the impacted soils is adopted so soil pores can be moisture saturated to increase the effectiveness and shorten the reclamation period. A useful rule of thumb is that a unit depth of water will remove nearly 80 percent of soluble salts from a unit soil depth. Thus 30 cm water passing through the soil will remove approximately 80 percent of the soluble salts present in the upper 30 cm of soil (See Food and Agriculture Organization of the United Nations, FAO Soils Bulletin 39: Salt-Affected Soils and their Management, 1988). Time period needed for the reclamation of soluble salts depends on major factors of ponding water head, root zone depth, type of soil, types and contents of organic matter, and drainage conditions. Based on past experience the time period needed for reclamation of soluble salts may take weeks to months, or even years (refer to the above-mentioned USDA Agriculture Handbook No. 60). As reported in the USDA Handbook No. 60, in some parts of the Imperial and Central Valleys of California, where infiltration rates are low, water is ponded on the surface by the contour-check method for periods up to 120 days. In such instances, rice is sometimes grown to aid in the reclamation process and also to provide income during leaching. In other areas, rice is included regularly in the crop rotation as an aid in salinity control. However, this reclamation method may create some drawbacks, such as losses of plant nutrients, lengthy time period requirements, saturation of soil pores required for higher efficiency, contamination of receiving waters (such as groundwater) by salts, and losses of valuable water resources especially in the arid and semi-arid areas where water availability is low and evaporation rate is high. Most of the salt reclamation methods practiced so far are less concerned on the above issues. One of the objectives of the subject invention is to overcome all of the above drawbacks. Although organic matters such as composts, straw, manure, and hay have been applied on or mixed into soils to enhance the leaching rates and reduce the nutrient loses, better improvements are still necessary.

For the removal of insoluble salts from soils, however, application of the simple water leaching method as discussed above for the removal of soluble salts is insufficient and ineffective. In the situation, adding appropriate materials or chemical compounds are required by either mixing into impacted soils or adding into the leaching water. Different reaction processes and chemicals used for different insoluble salt species are involved for desalination. Among insoluble salts in soils, existence of insoluble sodium species is either by attaching to small soil particles (such as clays) by ion-exchange and adsorption, or by attaching to soil-organic solid species by complexation/chelation. Insoluble sodium species in soils are seldom existed as simple sodium salt solid compounds such as sodium chloride or carbonate due to their highly soluble nature in water. Sodium salts may form simple solid species (precipitates) in soil solutions mostly when soils in agricultural fields are drying out by evaporation or transpiration. Some complex sodium-containing solid compounds are existed in certain clay minerals in soils (such as montmorillonite clays), but they are extremely insoluble and will not cause sodic problem to plants. Amount of Insoluble sodium in soils can be estimated by Cation Exchange Capacity (CEC) test, and expressed by a term "exchangeable sodium." Insoluble potassium in soils has the similar phenomena as that of sodium. However, calcium and magnesium, besides the existence of their respective insoluble species as exchangeable ions in soils, they may exist as their respective solid species, such as carbonates, chlorides, nitrates or phosphates, due to their relatively insoluble nature in water comparing to that of sodium and potassium. Among the four types of cation salts (i.e., Na, K, Ca, and Mg) in soils, sodium is the major salt of concern when adverse effects to plants are considered. Potassium is a macronutrient to plants, and calcium and magnesium are themselves secondary nutrients to plants, their removal from soils are mostly not problems unless they are existed in unusually high concentrations beyond the plant allowable limits.

Traditionally, removal of insoluble sodium from soils are also done by irrigation-leaching-drainage, but with addition of leaching chemicals in the leaching water. The kind and amount of chemical amendment to be used for the replacement of exchangeable sodium in soils depend upon the soil characteristics, the desired rate of replacement, and economic considerations. Chemical amendments practiced in the past for the replacement of insoluble sodium in sodic soils are of three types: (1) soluble calcium salts, such as calcium chloride and gypsum, (2) acids or acid-formers, such as sulfur, sulfuric acid, iron sulfate, aluminum sulfate, and lime-sulfur, and (3) calcium salts of low solubility, such as ground limestone, and byproduct lime from sugar factories. When sulfur is used, it must first be oxidized by microbial action to the sulfate form to be available for reaction, it is usually classed as a slow-acting amendment. When calcium compounds are used, they are dissolved into calcium ion so insoluble sodium can be exchanged into the soil solution and leached out. The available data in the open literature indicate that when the exchangeable sodium percentage (ESP) of the soil exceeds 25, 90 percent or more of the calcium supplied by the amendment replaces exchangeable sodium as the soil is leached. Among the above chemical amendments, gypsum is the most popular compound selected. The rate of reaction of gypsum in replacing sodium is limited only by its solubility in water; its solubility is about 0.25 percent at ordinary temperatures.

Various desalination methods, devices and chemicals in addition to the above-mentioned practices are known in the art to improve some of the desalination problems. U.S. Pat. No. 4,687,505 discloses a method for the desalination and reclamation of irrigated soils through application to the irrigation water of minute amounts (0.1 to 100 ppm) of one or more anionic low molecular weight (MW from 300 to 5000) synthetic polymeric compounds and/or organophosphorus compounds. The low molecular weight anionic synthetic polymeric compounds contain polymers, copolymers and sulfonated polymers and copolymers of acrylic acid, methacrylic acid, hydrolyzed polymers and copolymers of maleic anhydride. The organophosphorus agents include phosphonic acids as hydroxyethylidene diphosphonic acid, amino tri (methylenephosphonic acid), and nitrilo trismethylene triphosphonic acid, and phosphinic acids. The leaching chemical concentrations disclosed by this patent may be too low to be effective. For example, using the highest suggested 100 ppm of complexation organics in irrigation water, as mentioned above, can only create a leaching solution with 0.01% of complexation agent, which may not be sufficient in theory to complex saline and sodic salts usually in the tens to over one % ranges in impacted soils. The anionic nature of the polymers suggested, although can compete with soil CEC to seize cationic salts, the negative nature of leaching compounds may reduce the effectiveness to penetrate the minute pore liquid pathways where clay and soil organic particles also contain negative charges to form repelling forces. Especially in sodium rich soils where waterlogging is usually occurred to prevent leaching solution movement. Requirements of the leaching and drainage conditions are not discussed in this invention. It is believed that the disclosed invention will work effectively when the impacted soils are saturated with water, which are major constraints to impacted soils in the arid and semi-arid regions. Salts in soils with field soil moisture contents below saturation, or even below field capacity, will not have enough chances to contact the leaching solutions. However, when the relative dry soils are brought to their saturation, gravity may cause the leached fluid polluting soils and groundwater below the root zone treatment areas. Current drainage methods practiced are still unable to divert all leaching fluids to the collection drains.

U.S. Pat. No. 4,755,206 discloses a leaching solution with concentrated calcium or magnesium salts (1 to 4%) dissolving in 1 to 2%, high molecular weight (about 1,000,000 to 20,000,000) soluble anionic polyacrylamide polymer is disclosed. The patent suggests that the negative functional group sites of the polymer are saturated by calcium or magnesium cations. The preferred salts used are calcium nitrate or chloride which are more soluble than gypsum used conventionally. The method uses calcium or magnesium cations to form complexes which occupying the negative sites of the polymer before applying to impacted soils. It is believed that the type of polymer solutions would be easier to penetrate into soil pores and exchange out sodium by calcium or magnesium. Again, requirements of the leaching and drainage conditions are not discussed in the disclosed invention. It is believed that the disclosed invention will work effectively only when the impacted soils are saturated with water as discussed above, which are major constraints to impacted soils in the arid and semi-arid regions. Salts in soils with field soil moisture contents below saturation, or even below field capacity, will not have chances to contact the leaching solutions. If the relative dry soils are brought to their saturation, gravity may cause the leached fluid polluting soils and groundwater below the root zone treatment areas. None of these issues are discussed in the patent.

Three U.S. Pat. Nos. 4,923,500, 5,106,406, and 5,712,224, continuously disclose and are basically extensions of the previous U.S. Pat. No. 4,687,505. A general chemical structure of the organic polymers is proposed as the leaching/chelating chemicals which includes multiple functional groups such as hydroxyl, COOH, phenol, alkyl, etc. Neutral salts, in addition to the anionic compounds of the polymers are disclosed in U.S. Pat. No. 4,923,500. The contents of U.S. Pat. No. 5,106,406 are similar to that of U.S. Pat. No. 4,923,500, except that the latter is dealing with seed coating for improving propagation in soils. Again, contents of U.S. Pat. No. 5,712,224 are similar to that of U.S. Pat. No. 4,923,500, except that a pesticide composition is mixing into the salt leaching solution for agricultural soils. If based on the chemical structures claimed in these patents, hundreds or even hundreds of thousands of possible compounds may be derived. Since the formation constants of these potential compounds with cation salts are unknown, effectiveness of these compounds to be used as complexation agents are unknown. Also, requirements of the leaching and drainage conditions are not discussed in this invention. In order for these chemicals to work for salt leaching from soils, the impacted soils shall be saturated or near saturated with water. Again, how to maintain the soil moisture contents at or near saturation is one of the major concerns for desalination of impacted soils in the arid and semi-arid regions. Salts in soils with field soil moisture contents below saturation, or even below field capacity, will not have chances to contact the leaching solutions. In most cases, when the relative dry soils are brought to their saturation, gravity may cause the leached fluid polluting soils and groundwater below the root zone treatment areas unless soil moisture at the bottom boundary of the root zone is less than field capacity. Current state of the art methods for drainage of leaching fluids practiced are still unable to divert all leaching fluids to the collection drains to meet the above condition.

Due to highly soluble nature of sodium salts, it is generally recognized that leaching/solubilization rate of insoluble sodium salt will not be the limiting factor when shorten of reclamation period is concerned. For conventional leaching operation, migration of sodium ions through the pore space in soils are usually carried out by the hydraulic flow. The subsurface hydraulic flows are usually very slow, especially for clayey and silty soils. The electrokinetic method is therefore developed to increase the sodium ion migration rates by the aid of electric field building up in soils. For example, U.S. Pat. No. 5,074,986 and literature cited therein disclose the use of electrokinetic method to purge the liquid to move soil solution faster than hydraulic flow rate by electroosmosis. In the disclosed invention, the electroosmosis volume flow rate can be within a range from about $10^{-7}$ to $10^{-6}$ m/sec. U.S. Pat. No. 5,398,756 further disclose that the major advantage for electroosmosis as an in-situ remediation method for difficult media, e.g., clay and silty sand, is its inherent ability to get water to flow uniformly through clay and silty sand at 100 to 1,000 times faster than attainable by hydraulic means.

U.S. Pat. No. 6,193,867 relates to methods for soils desalination as well as remediation of heavy metals and organics contamination by electrokinetic principle. Two types of solutions, i.e., acids (such as citric, acetic, oxalic, salicylic, or mixture thereof) and Zeta Potential Modifying Compounds (ZPMCs, mainly negatively charged compound selected from EDTA, DTPA, NTA, or mixture thereof), are applying into the electrode well or surrounding impacted soils. The main purpose of the disclosed invention is to enhance electroosmotic flow and improve electromigration in porous impacted soils so impacted salts and heavy metals can be collected by the cathode. It can be realized that comparing to the conventional methods mentioned, the disclosed method can enhance the rate of leaching and salt ion migration rates, therefore, theoretically can enhance the reclamation rates and efficiencies due to the existence of the electric field and leaching chemicals used. However, several drawbacks may still exist for this type of electrokinetic method: (1) application of the electrokinetic method still requires moisture contents at or near saturation in soils in order to be effective, as explained previously; (2) electrode wells are used as the drainage system for leaching fluid collection, which may not be effective due to distance arranged (usually several meters or higher) and shallow nature of the root zone depths (usually only about 20 cm to 1 m for salt reclamation in agriculture fields), which will cause collection difficulty on the leaching fluid (that means, majority of the leached solution may flow downward by gravity before reaching the vertical electrode collection wells); and (3) soil and groundwater contaminations caused by downward migration of flow which contains high concentrations of salts, heavy metals, toxic organics and leaching chemicals below the root zone depth will happen.

Different from the above disclosure, another electrokinetic method for in-situ remediation, U.S. Pat. No. 7,759,536 discloses the use of horizontal electrodes arranged in a set of plurality of electrode placed in an upper plane and another set placed in a lower plane. The electrode configuration includes a copper wire as the electrical conductor, a well screen (perforated PVC pipe) as the leached fluid collector, a horizontal borehole for locating the well screen, and an annular space of the borehole for filling with conductive materials such as granular carbon. It claims that, in comparison to placing electrodes in the ground surface extending vertically down into the subsurface soil, by placing horizontally a more uniform electrical field is created over the contamination zone and a larger area can be covered with less electrodes. However, no information was provided regarding to depths of electrode planes and spaces of the parallel electrodes in each plane. By evaluating the disclosed invention, some problem areas may still exist, such as: (1) no effective leaching solution supply system is mentioned and provided, especially for remediation of impacted soils near the ground surface; (2) to move ions upwards into the upper plane of electrodes may be questionable especially during soil unsaturated conditions and without the aid of leaching solution; and (3) no method and conditions are provided to maintain the soil solution in a saturated condition or above field capacity in order to maintain fluid continuity for ion migration.

U.S. Pat. No. 8,926,814B2 discloses apparatus and method for electrokinetic in-situ leaching remediation of contaminated soils. Again, vertical electrode wells (chambers) were proposed to hold electrodes similar to that of U.S. Pat. No. 6,193,867. Permeable Reactive Barrier (PRB) is proposed in this invention and arrange in multiple vertical planes perpendicular to that of groundwater flow direction. An anode and a cathode are located at upstream and downstream, respectively, of the PRBs. Leaching solutions such as acid or base is spraying on the impacted ground surface during reclamation operation. The disclosed invention claims that through electrokinetic enhanced operation, PRBs' provision and spray of acidic and/or basic leaching solution, the remediation can be optimized, and accelerated. It is apparent that the disclosed design may work only when the groundwater is present and PRBs are extended deep enough into the groundwater table so salts, metals and other organic contaminants can be removed. No disclosure on how the contaminants trapped by PRBs are removed. It is suggested that pH adjustment to the 8 to 10 range as claimed may not be effective for both salts and heavy metal leaching. It is also suggested that spraying of leaching solutions on ground will not enhance the hydraulic flow rate, and may not be able to constantly keeping subsurface soils in saturation condition.

U.S. Pat. No. 9,475,106B2 discloses the application of alkaline aqueous solutions having a pH of at least 7, comprising calcium and/or magnesium peroxides, and a chelating agent to dislodge sodium ion. Spraying or injecting of these compounds into soils are claimed. However, how the spraying solution to reach any necessary moisture contents are not discussed. It is also not disclosed that if the moisture contents of the impacted soils are not in the saturated conditions, how the contaminants can be dislodged and removed.

U.S. Pat. No. 9,486,844B2 discloses a method of treating saline-alkali land by using electrolysis to produce acidic water and using the produced acidic water to leach salts between pluralities of electrodes which are arranged vertically and 0.5 to 20 cm apart. It is suggested that the method may not be technically feasible and economically viable due to such a close arrangement of pluralities of electrodes. Since the depths involved for the reclamation of saline-sodic soils for agricultural purpose are very shallow (usually less than 1 m depth of soils), a direct application of acidic solution, would be much simpler, easier, and much more economic than this invention. Considering that a piece of sodium impacted land with area greater than hundreds of acres would require hundreds of thousands or more of boreholes for electrode installation by the disclosed invention. Also, how to maintain the treated soils in a saturated, or greater than field capacity conditions are not mentioned. It is suggested that the acidic leaching solution is not required for sodium dissolution. Acidic leaching solution may be assisted in calcium and/or magnesium leaching, which in turn, exchanged out the sodium in soils. If soils are lack of calcium and magnesium salts, adding acid to the soils for salt removal may not be required.

From the above discussion, it is clear that for the in-situ desalination of impacted agricultural soils, although other types of approach such as using salt removal plants have been tested, the technology applied in the past is mainly by the use of three consecutive procedures of irrigation (or leaching solution application)—leaching—drainage. In order to enhance the reclamation rates and increase leaching efficiencies, electrokinetic method with leaching/extraction chemical compounds are generally considered. Extraction reactions such as Ion-exchange and/or complexation/chelating processes are used for dissolution of insoluble salts so they can be leached out and be drained away for removal. However, for heavy metal remediation of soil impacted sites, comparing to that of desalination, will be much more complicated and more technologies can be applied. As discussed below, in-situ metal removal is considered the best approach in terms of cost-effectiveness, and protective of human health and the environment. In term of heavy metal in-situ remediation, the concept, equipment, and the three consecutive procedures, as applied for desalination, are similar, and reclamation system exchangeable.

For heavy metal contaminated soils, the physical and chemical forms of heavy metals in soils, cost-effectiveness of reclamation method, future land use, and possible site environmental condition changes will strongly influence the selection of the appropriate remediation approach. Therefore, the site survey and characterization, cleanup level establishment, and bench and/or pilot tests are critical for the development of a feasibility study plan before selection of remediation technology and system. Selection of the heavy metal remediation method becomes complicated issues of legal, future land use consideration, risk assessment, and maybe even a public participation issue, not just a technical issue. In terms of technical approach, remediation of metal-contaminated soil shall first compare the following two approaches: ex-situ or in-situ remediation. In-situ method is general more cost-effective than that of ex-situ method due to no needs for excavation of contaminated soil, and no backfill and/or off-site transportation and disposal required, especially for a remediation of a relative deep contamination site and/or a large contamination area involved. The ex-situ approach usually involves three major options—(1) on-site treatment and on-site backfill, (2) on-site treatment and off-site disposal, and (3) off-site treatment and off-site disposal. The off-site disposal is considered not environmentally desirable, which has the potential to create another waste disposal site, and causing impacts from transportation. The in-situ approach usually involves two major options: (1) immobilization of heavy metals, and (2) subsurface heavy metal extraction and removal. Selection between these two options requires a sufficient evaluation of the site-specific conditions. Immobilization option commonly involves the chemical solidification and fixation/vitrification methods. Immobilization of heavy metal on-site may affect future land use, has a potential to cause future soil and groundwater contamination when subsurface environmental conditions changes, and has potential health impacts for future human contacts such as contacted by children in a future residential developed area. Immobilization option also will exclude the land for future agricultural purposes. Therefore, consideration of the above situations, the in-situ heavy metal extraction and removal option would be more desirable.

The applications of the in-situ technologies for subsurface extraction and removal of heavy metals and radionuclides have been extensively studied through funding by the US Environmental Protection Agency (USEPA) since the implementation of the Super Fund Legislation. Applicable technologies such as soil flushing with the application of extraction agent(s), electrokinetic separation, bioremediation, and phytoremediation are suggested in the past for soil heavy metals remediation (such as reported and cited by USEPA Document, EPA 542/F-06/013, November 2008, www.epa.gov/tio/tsp). Among the above-mentioned technologies, the electrokinetic method with the application of extraction agent(s) is considered an effective technology. Electrokinetic method for subsurface metal remediation is an emerging technology that usually relies on the application of an electrical potential gradient between electrodes located in a soil activates a series of electrokinetic transport mechanisms capable of mobilizing water (electroosmosis), ionic metal species (electromigration) and even charged particles (electrophoresis) containing contaminated metals. Numerous modifications and improvements of the electrokinetic method, especially after 1990's, are proposed by many patents.

U.S. Pat. No. 5,074,986 discloses the use of a purging liquid to a source electrode to increase the electroosmosis flow to move the contaminants toward the sink electrode. Example of purging fluid used in the invention is a non-toxic salt. The invention discloses that the preferable voltage range is 20 to 200 V, electrode spacing range is 1-5 m, current density range is 0.01-5 A/m$^2$, to achieve an electroosmotic flow rates of $10^{-7}$ to $10^{-6}$ m/sec. By evaluating the proposed system, several drawback may exist for this type of electrokinetic method: (1) no method was provided to maintain the moisture contents in the treated soils at or near saturation in order to avoid formation of dry soil particles when water in soil pores below moisture saturation and render the purging of metals from the dry particles impossible; (2) electrode wells are used as the drainage system for leaching fluid collection, which may not be effective due to distance arranged between electrodes which may cause the leached solution flow downward by gravity before reaching the vertical electrode collection wells; and (3) soil and groundwater contaminations caused by downward migration of the gravitational flow which contains high concentrations of heavy metals, and leaching chemicals below the contaminated zone may happen. Any of the above situations could cause the failure of the electrokinetic system.

U.S. Pat. No. 5,398,756 discloses an electrokinetic system to improve the electrokinetic method. The disclosed invention uses at least one liquid permeable region within a contaminated soil region. The permeable region is formed by a method selected from the group consisting of hydrofracturing, pneumatic fracturing, impulse fracturing, directional drilling, sheet pilling, trench formation and soil drilling/mixing. Electronically conductive material, such as electron acceptors, catalysts, adsorbents, surfactants, electron donors, co-metabolites, chelating agents, ion exchange resins, buffers, salts and combinations thereof, are introduced into the liquid permeable region. Advantages discussed include creation of electroosmotic flow rates which can be $10^2$ to $10^3$ times faster than the hydraulic flow rates especially for clayey type of soils, prevention of part of the soil bed become dry (which may happen for certain sites after one month of remediation operation), and prevention of $H^+$ formation and migration which could reduce the flow rates and could eventually stop the remediation process. In a close review on the disclosed invention, however, it is suggested that the fractured liquid permeable region could increase the soil permeability in the region to increase the chance of downward flow casing substrata soil contamination. The design may also cause the unfractured contaminated soils become drying below moisture saturation.

U.S. Pat. No. 5,725,752 discloses configurations of electrodes, and materials used for electrode construction for the land decontamination by electrokinetic method. Specific design includes a carbon felt wrapping around current and electrolyte feeders for the anode, and a porous housing with electrolyte for the cathode. It discloses that the carbon felt material can avoid the loss of electrolyte and prevent increase of current resistivity in soil around anode. It also discloses that the advantage of housing the cathode inside a porous housing rather than direct contact with the soil is that the pH in the vicinity of the cathode can be controlled by acidifying the catholyte stream to avoid hydroxide precipitation.

Other improvement of electrokinetic methods discussed above for the desalination are also can be useful for metal remediation of subsurface soils. For example, U.S. Pat. No. 6,193,867 relates to the use of two types of solutions, i.e., acids (such as citric, acetic, oxalic, salicylic, or mixture thereof) and Zeta Potential Modifying Compounds (ZPMCs, mainly negatively charged compound selected from EDTA, DTPA, NTA, or mixture thereof), to enhance electroosmotic flow and improve electromigration in porous impacted soils. U.S. Pat. No. 7,759,536 discloses the use of horizontal electrodes arranged in a set of plurality of electrode placed in an upper plane and another set placed in a lower plane, claiming that, in comparison to placing electrodes in the ground surface extending vertically down into the subsurface soil, more uniform electrical field is created over the contamination zone and a larger area can be covered with less electrodes. U.S. Pat. No. 8,926,814 B2 discloses Permeable Reactive Barrier (PRB) arranged in multiple vertical planes perpendicular to that of groundwater flow direction and claims that PRBs' provision and spray of acidic and/or basic leaching solution on the ground surface the remediation can be optimized, and accelerated. U.S. Pat. No. 9,475,106 B2 discloses the application of a peroxide and a water-soluble chelating agent into soils, and claimed that hydroxyl radical can be formed to aid the removal of metals.

As discussed above, numerous patents have proposed in the past to improve the design of the electrokinetic method and enhance the efficiency of salts and/or heavy metal extraction and removal. As of now, several important issues are still not included in the past patented methods, such as: (1) how to maintain the moisture contents of the remediating soils in or near the saturation condition so all the contaminants can be contacted by the leaching/extraction solution(s), (2) how to prevent the leaching and/or leached solutions migrate downward beyond the contaminated zone, (3) how to shorten the remediation time needed, (4) how to conserve water yet maintaining sufficient moisture in soils for remediation in the arid or semi-arid areas, and (5) how to simultaneously improve the remediated soil qualities better suited for future land uses, especially when agricultural purposes are concerned.

The electrokinetic method with the application of extraction agent(s) is considered an effective technology for the reclamation of metal contaminated soils. Type of metals remediated in the past include soluble and solid species of salts, heavy metals, radionuclides or combination of these metals. The reclamation operational methods applied in the past are mainly using three consecutive procedures of irrigation (or leaching solution application), leaching and drainage. Due to the nature of very low hydraulic conductivity of subsurface soils, irrigation with ponding or flooding is traditionally used to increase the leaching rates and maintain moisture saturation or near saturation conditions in the soil pores. Various leaching chemical(s) are applied to dissolve the solid species of metals so soluble ionic and nonionic metal species can be formed and leached out by hydraulic flow. Due to very slow migration rates of metal species carrying by the hydraulic flow, electrokinetic method is used to enhance the metal removal efficiency. Many different designs of electrokinetic method with the supply and removal of leaching/extraction chemical compounds are gradually developed especially after 1980's when metal remediation became an important issue of concern. Electrokinetic methods for subsurface metal remediation relies on the application of an electrical potential gradient between electrodes located in a soil to activate a series of electrokinetic transport mechanisms capable of mobilizing water (electroosmosis), ionic metal species (electromigration) and even charged particles (electrophoresis) containing contaminated metals in order to enhance the reclamation rates and increase leaching efficiencies. Extraction solution(s) containing ion-exchange materials, solubilization chemicals, complexation/chelating compounds or combinations of above are used for dissolution of insoluble metals so they can be leached out and be drained away for removal. These leaching compounds are applied or removed through the electrode casings, arranged vertically or horizontally, or direct applied to soils by spraying or flooding practices, and removed by drains.

Although numerous modifications and improvements of the electrokinetic method are proposed by many inventors as discussed previously, however, many critical issues and necessary conditions for the success of applying the Electrokinetic methods are not proposed in the past, such as: (1) how to maintain the moisture contents of the remediating soils in or near the saturation condition so all the contaminants can be contacted by the leaching/extraction solution(s) and be removed, (2) how to prevent the leaching and/or leached solutions migrating downward beyond the contaminated zone to avoid polluting the soils and groundwater down below, (3) how to further shorten the remediation time needed beyond the current electrokinetic methods which usually are still requiring months or even years to effectively remediating the impacted soils, (4) how to conserve water yet maintaining sufficient moisture in soils for remediation in the arid or semi-arid areas, and (5) how to simultaneously improve the remediated soil qualities better suited for future land uses, especially when agricultural purposes are concerned.

SUMMARY OF THE INVENTION

The present invention not only discloses an innovative design of more effective electrokinetic system in comparison to the current technology, but also provides solutions to the above listed critical issues.

The objective of the present invention is to provide improved in-situ remediation systems which can be used to reclaim contaminated soils impacted by salts, heavy metals, and radionuclides. The present invention involves provision of multiple methods and devices for the contaminated soil remediation which include electrokinetic method and devices, leaching solution diversion method and devices, soil negative pressure moisture control method and devices, pressurized leaching/extraction method and devices, and sequential leaching/extraction method and chemicals for the improvement of the remediation efficiency, enhancement of contaminants migration rates, shortening of remediation period, and prevention of secondary subsurface contamination.

Specific solutions which are lacking in the previous patented processes are proposed in the present invention, including: (1) how to maintain the moisture contents of the remediating soils in or near the saturation condition so all the contaminants can be contacted by the leaching/extraction solution(s), (2) how to prevent the leaching and/or leached solutions migrate downward beyond the contaminated zone, (3) how to shorten the remediation time needed, (4) how to conserve water yet maintaining sufficient moisture in soils for remediation in the arid or semi-arid areas, and (5) how to simultaneously improve the remediated soil qualities better suited for future land uses, especially when agricultural purposes are concerned.

BRIEF DESCRIPTION OF THE DRAWINGS

The invention will be described in more detail by way of example only, with reference to the accompanying drawings. The following drawings are provided:

FIGS. 1A to 1C are illustration diagrams showing the shallow vertical electrokinetic system of the present invention, among which, FIG. 1A is a plan view of the basic electrokinetic system component of the present invention; FIG. 1B is a cross section view from the A-A' line in FIG. 1A showing major components of the basic electrokinetic system of the present invention; and FIG. 1C is an expanded view showing the shallow electrokinetic system in the present invention.

FIGS. 2A, 2B, 2C, and 2D collectively show the electrode configurations, leaching solution supply, and removal lines, and moisture control sensor of the present invention, among which, FIG. 2A shows a below-grade horizontal electrode and a leaching solution supply or removal device in the present invention; FIG. 2B shows a ground-surface horizontal electrode and a leaching solution supply or removal device in the present invention; FIG. 2C shows a moisture control sensor in the present invention; and FIG. 2D shows a vertical electrode and a leaching solution supply or removal device in the present invention.

FIGS. 3A, 3B, and 3C are illustration diagrams showing metal transformation/migration mechanisms and types of species in soil-water environments in the present invention, among which FIG. 3A shows metal transformation and migration mechanisms in subsurface soil environment in the present invention, and reference numbers are 311—chemical transformation, 312—bio-oxidation, 313—sorption, ion-exchange, and/or complexation/chelating (CEC mechanism), 314—dissolution, 315—diffusion, 316—complexation/chelation, 317—precipitation, 318—free ion, and 319—complex species;

FIG. 3B shows soluble metal species and a colloidal soil particle with negative charge and CEC effects in the present invention, and reference numbers are: 321—negative charge, 322—free metal ion, 323—ligand species, 324—positive charge complex species, 325—negative charge complex species, 326—neutral species, and 327—double layer; and FIG. 3C shows metals in various solid phases in the present invention, and reference numbers are: 331—metals in CEC phase, 332—metals in reducible phase, 333—metals in oxidizable phase, 334—metals in lithogenic phase, 335—soil particle, and 336—other soil particle ingredients.

FIGS. 4A and 4B collectively show the leaching solution collection system in the present invention, among which, FIG. 4A shows a profile of the leaching solution collection system and cross section view along B-B' line of FIG. 4B in the present invention; and FIG. 4B shows the major components of the leaching solution collection system in the present invention.

FIGS. 5A and 5B collectively show the configuration of a shallow horizontal design of the electrokinetic system in the present invention, among which, FIG. 5A shows the layout of the shallow horizontal electrokinetic system of the present invention; and FIG. 5B shows a cross-section view along C-C' line in FIG. 5A of the shallow horizontal electrokinetic system in the present invention.

FIGS. 7A and 7B collectively show the control system for the reclamation of metal contaminated soil in the present invention, among which, FIG. 7A shows a plan view of the control system in the present invention; and FIG. 7B shows a side view of the control system in the present invention.

FIGS. 8A and 8B are schematic diagrams showing the derivation of minimum hydraulic head requirement for leaching solutions in the present invention, among which, FIG. 8A shows potential leaching solution migration plume boundary in the present invention; and FIG. 8B shows minimum hydraulic head requirement to maintain soils in saturation condition between two electrodes in the present invention.

DETAILED DESCRIPTION OF THE INVENTION

The present invention provides not only an innovative design of a more effective electrokinetic system, but also solutions to the above listed critical issues. The basic principles, subject designs and applicable methods and equipment proposed, as well as operational procedures are further explained as follows.

1. Basic Principles, and Comparisons of Desalination and Heavy Metal Remediation The soil reclamation principles of physical and chemical reaction mechanisms for salts or heavy metals remediation, are basically similar. The reclamation equipment and operational procedures are also similar and can usually be applied to both salt and heavy metal remediation situations. However, there are differences between desalination and heavy metal remediation due to their differences in specific remediation objectives, differences in areal scale and location/depth of reclamation, dissimilarity in specific physical and chemical characteristics among metals and their compounds, and differences in cleanup levels required. For desalination of soils, the main reclamation objective is for salts removal, especially sodium metal removal, for the agricultural purposes. For soil heavy metal remediation, however, the major objectives are for the concerns of health safety and environmental impacts. In terms of scale of reclamation, the desalination areas can be very large such as for a big agricultural field which can be tens of thousand acres or larger, but desalination depths are usually very shallow which are corresponding to root zone depths such as from tens of cm to about 1 m depth. For soil heavy metal remediation, however, the reclamation area can be from a small spill area of several acres to a very large industrial area or a very large disposal site, and the depths of contamination are usually much deeper than that of root zone depths. In terms of the dissimilarity of specific physical and chemical characteristics of metals and their compounds, sodium and other salts of concern are relatively highly soluble and the insoluble salt species are mainly formed by species attaching to soil particles by cation-exchange, adsorption, and/or complexation/chelating mechanisms (hereafter collectively called these mechanisms "CEC mechanism", or Cation-Exchange-Capacity mechanism). However, for heavy metals a multitude of reaction mechanisms, in addition to CEC mechanism, can control the transformation and migration of soluble and solid heavy metal species.

Figure 3A:
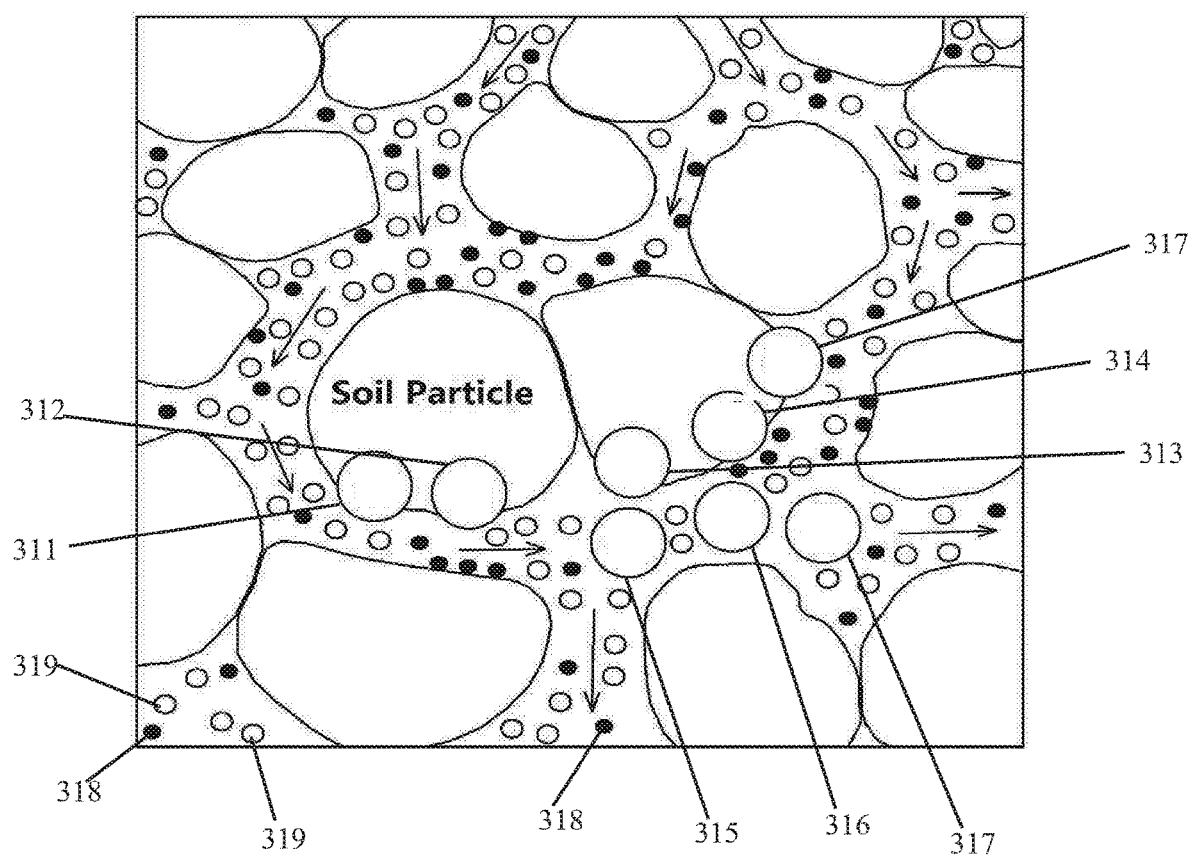
Figure 3B:
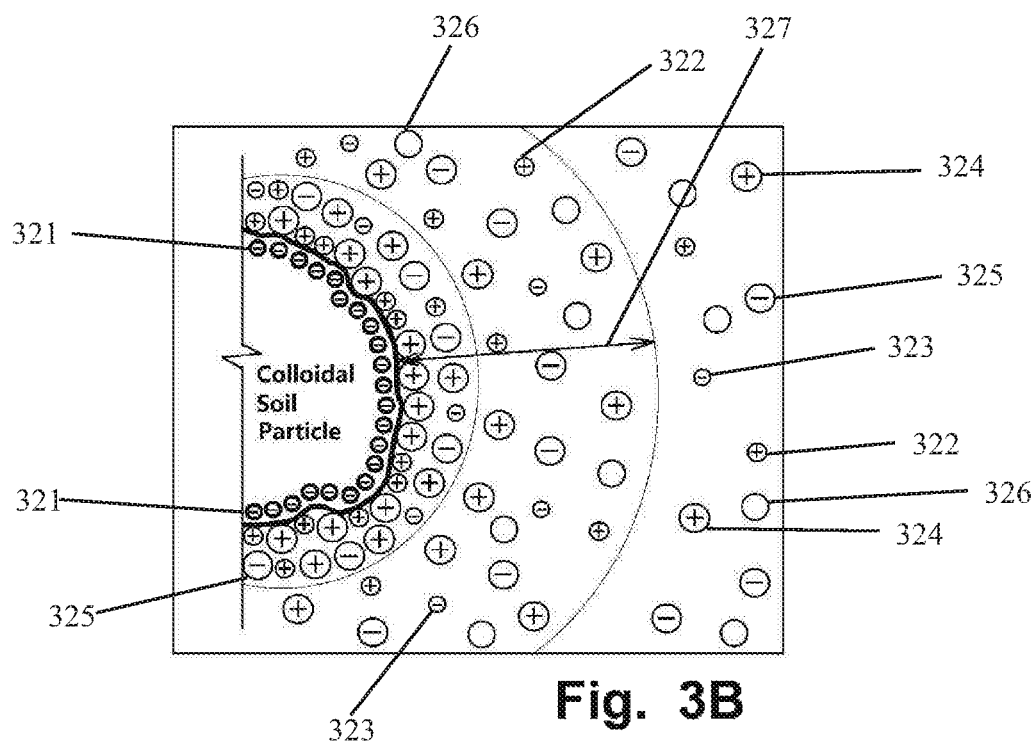
Figure 3C:
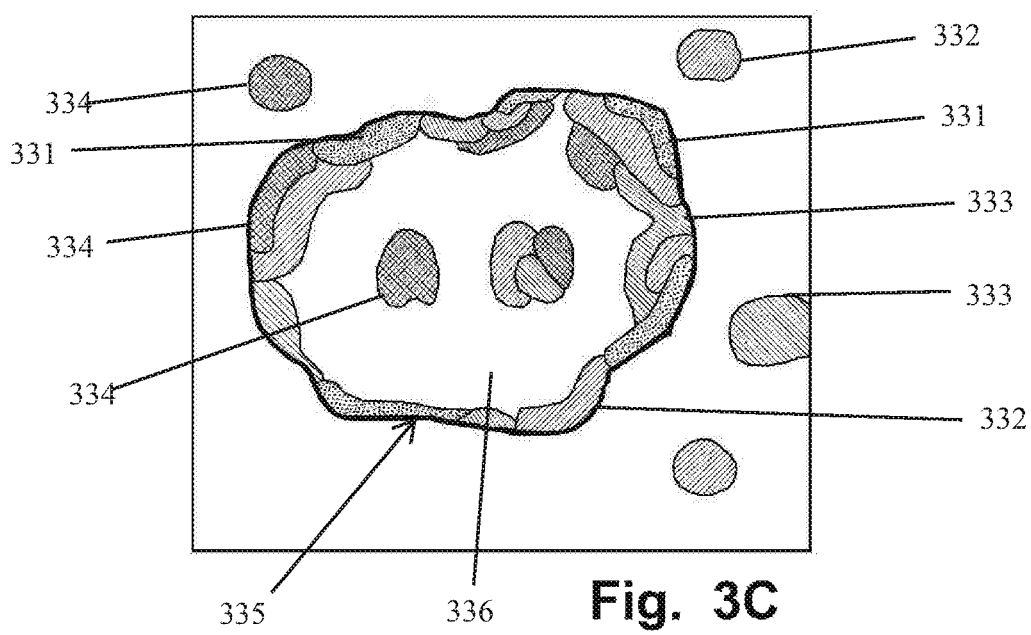

The illustration diagrams of metal transformation/migration mechanisms and types of metal species in soil particles 335 and pore water are shown in FIGS. 3A to 3C. As illustrated by FIG. 3A, there are seven major mechanisms may occur at the interfaces of soil particles and in the soil-pore water: chemical transformation 311, bio-oxidation 312, sorption, ion-exchange, and/or complexation/chelation 313 (i.e., CEC mechanism 313), dissolution 314, diffusion 315, complexation/chelation 316 (in solution), and precipitation 317. Through thermodynamic analyses, application of solubility products and complex formation constants for calculations, and evaluation of environmental conditions (i.e., pH, redox potential and ionic strength), the transformation trends of potential metal solid species and possible soluble metal species and concentrations in the subsurface soil-water environments can be estimated or projected. When insoluble sodium species is formed on the surface of soil particles the major reaction mechanism is CEC mechanism, as shown in FIG. 3B. This fact is mainly caused by highly soluble nature of sodium and no insoluble sodium solid species can be formed by the environmental condition changes (i.e., pH and redox potential changes). However, for heavy metals, as shown in FIG. 3A at least five mechanisms may be involved at the soil particle surface: (1) chemical transformation 311 (i.e., changes in type of metal solid species, such as for cadmium, may transform from CdS in the reducing environments to $CdCO_3$ in the oxidizing environments), (2) bio-oxidation 312, (3) CEC mechanism 313, (4) dissolution 314, and (5) precipitation 317. The above situations are very important for the reclamation of metals in soils. Because, for in-situ removal of sodium or other salts from soils, only CEC related extraction chemicals are needed. However, due to the coexistence of various mechanisms, many phases of heavy metal solid species could be formed, as illustrated in FIG. 3C. Depending on environmental conditions in the soil-water environments and types of reaction mechanism occurred, the heavy metal solid species could coexist at least in four major phases in the subsurface soil environments: (1) CEC phase 331, (2) reducible phase 332, (3) oxidizable phase 333, and (4) lithogenic phase 334. Heavy metals in CEC phase 331 contain mainly cations (such as free metal ions and metal complex species in positive charge) attaching to soil particles as shown in FIG. 3B. Solid heavy metal species in reducible phases 332 usually contain metallic oxides, hydroxides, and/or simple silicates. Solid heavy metals in oxidizable phases 333 are usually existed as metallic sulfides and/or organometallic compounds. The lithogenic metal phase 334 includes metals incorporated in the clay minerals, which are very stable and usually are not harmful to plants and the environment.

Figure 9:
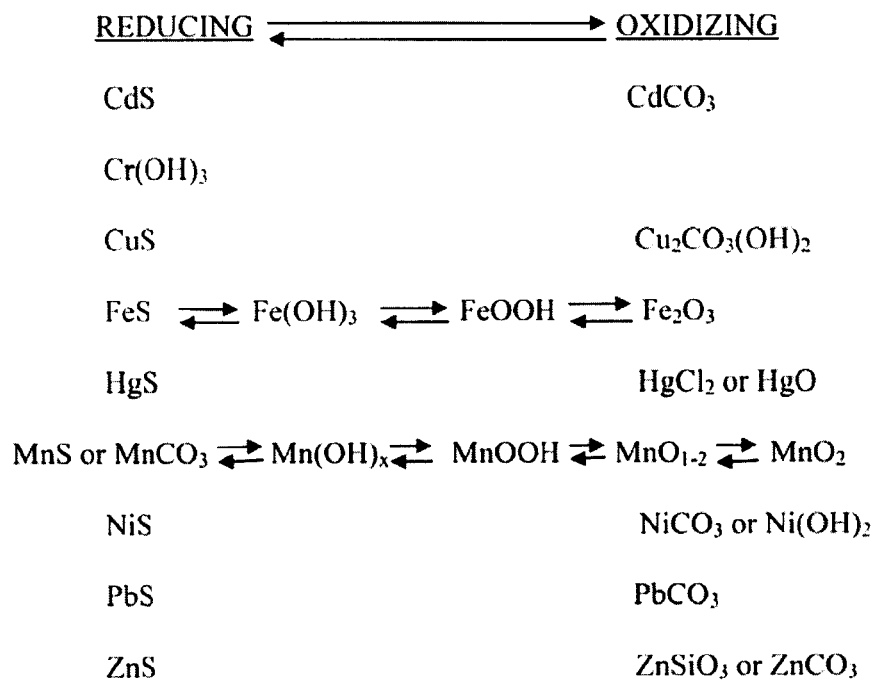
FIG. 9 shows the major solubility-controlling solids of reducible phases and their transformation directions for heavy metals in the present invention.

The reducible phase 332 and oxidizable phase 333 of heavy metal solids are believed to be the major factors controlling the transformation and solubilization of heavy metals when the environmental conditions (i.e., pH, Eh, and ionic strength) change in the soil environments. The major solubility-controlling solids of reducible phases and their transformation directions for heavy metals are shown in FIG. 9.

The above transformation trends can be derived by thermodynamic analyses based on environmental conditions, data of solubility products, ion-ratio, and existence and potential concentration levels of various ligands in the soil-water environments. The prevailing heavy metal solid species in the soil environments are the major controlling solid to control the dissolution or precipitation trends of heavy metals. This information is very important for the design and selection of extraction chemical(s) for the in-situ soil remediation of heavy metals. Extraction chemicals in this arrangement may require two major functions, one is to increase the dissolution of heavy metals from different phases, another is to complex with the dissolved free metal ions to further draw more metals into solution for removal. The concentrations of free heavy metal ions for any given metal M and its controlling solids $M_pX_q$ based on the equilibrium conditions can be evaluated by the following equations:

$$[M_f] = \left[ \frac{(K_{sp})_{MpXq}}{(\gamma_M)^p (\gamma_X)^q [X_f]^q} \right]^{1/p} \quad (1)$$

where $[M_f]$=concentration of free metal cations;
MpXq=solubility controlling solid as shown above; and
$\gamma$=ion activity coefficient.

When any soluble ligands L, including any cationic, anionic, and nonionic of inorganic and/or organic species, present in the soil solution the concentration of soluble metallic complex species will be formed through the reactions with the free metal ions. The concentration of complex species can be expressed as:

$$[M_mL(i)_n] = m\beta(i)_{nm}[M_f]^m[L(i)_f]^n \cdot \left[ \frac{\gamma_M^m \gamma_{L(i)}^n}{\gamma_{MmL(i)n}} \right] \quad (2)$$

Where $[L(i)_f]$=free concentration of the ith ligands;
n, m=composition of the complex $M_mL(i)_n$;
$\beta(i)_{nm}$=overall formation constant of complexes $M_mL(i)_n$; and
$\gamma_Y$=thermodynamic activity coefficient of species Y.

The total concentration of soluble heavy metals $[M_t]$ can then be estimated, as follows:

$$[M_t] = [M_f] + m \sum_{n=1}^{k} \sum_{i=1}^{j} [M_mL(i)_n] \quad (3)$$

$$[M_t] = [M_f] + m \sum_{n=1}^{k} \sum_{i=1}^{j} m\beta(i)_{nm}[M_f]^m[L(i)_f]^n \cdot \left( \frac{\gamma_M^m \gamma_{L(i)}^n}{\gamma_{MmL(i)n}} \right)$$

wherein i is ligand species; j is total number of ligand types; and k is the maximum number of ligands L(i) coordinate with $M_m$.

It is necessary that metal species shall be in soluble forms in soil solutions in order to be removed through migration with hydraulic flow or enhanced by various electrokinetic mechanisms such as electroosmosis, electromigration and electrophoresis.

The complicated phase situations of solid heavy metals species in soils require the use of a multitude of extraction chemicals and sequential extraction procedures for an effective dissolution of various phases of heavy metals from soil particles. Applicable heavy metal in-situ extraction chemicals for different metal phases and sequential extraction procedures are not reported in any past electrokinetic inventions for remediation, but will be disclosed in this invention as presented later in this report.

2. Reclamation Systems for Metal Removal from Shallow Contamination Depths

Soil reclamation systems for the shallow metal contamination proposed by this invention are mainly for contamination depths of salts and/or heavy metals in soils less than 2 m deep. This invention discloses two types of metal reclamation system for remediation of shallow metal contamination in subsurface soils as shown in FIGS. 1A to 1C and 5A to 5B. The type one system, as shown in FIGS. 1A to 1C, includes four major types of devices: a vertical electrode and leaching solution supply or removal device 15, a below-grade horizontal electrode and leaching solution supply or removal device 12, a leaching solution collection system 4, and a horizontal moisture control sensor 14, as shown in FIGS. 1A and 1B. The type two system is shown in FIGS. 5A and 5B, which include three major types of devices: a below-grade horizontal electrode and leaching solution supply or removal device 12, a ground-surface horizontal electrode and leaching solution supply device 13, and a moisture control sensor 14. Details of these devices are provided in FIGS. 2A to 2D and 4A and 4B.

FIG. 1A of the type one system shows a basic configuration of the arrangement of system components in a hexagonal shape. FIG. 1B shows a cross-section view of FIG. 1A. This basic configuration can be extended as needed by combination of a multitude of basic hexagonal configuration to cover a wider area as shown in FIG. 1C. In the extended design the below-grade horizontal electrode and leaching solution supply or removal device 12 can be connected as needed and shown in FIG. 1C. The hexagonal shape also can be arranged in other equiangular polygon such as equiangular triangle, and square. The below-grade horizontal electrode and leaching solution supply or removal device 12 is installed in a shallow trench at about 5 to 10 cm depths and backfilled with soil, for ease of construction yet deep enough to avoid evaporation. The device 12 can be used either as leaching supply or removal device depending on the needs. The depth of the vertical electrode and leaching supply or removal device 15 can be extended to the root zone depth or depth of shallow contaminated soil 9 if the depth is less than about 2 m, as shown in FIG. 1B. The vertical electrode and leaching supply or removal device 15 is located at the center of the hexagonal shape and is surrounded by the horizontal electrode and leaching solution supply or removal device 12, as shown in a plan view of FIG. 1C. Midway between the vertical electrode and leaching supply or removal device 15 and the horizontal electrode and leaching solution supply or removal device 12, a leaching solution collection system 4, as shown in FIG. 1C, is provided. In the hexagonal shape case, the leaching solution collection system 4 is also arranged in a smaller hexagonal shape, as shown in FIG. 1C.

Figure 4A:
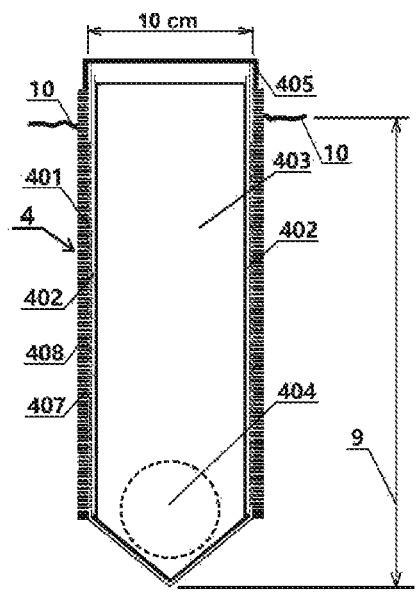
Figure 4B:
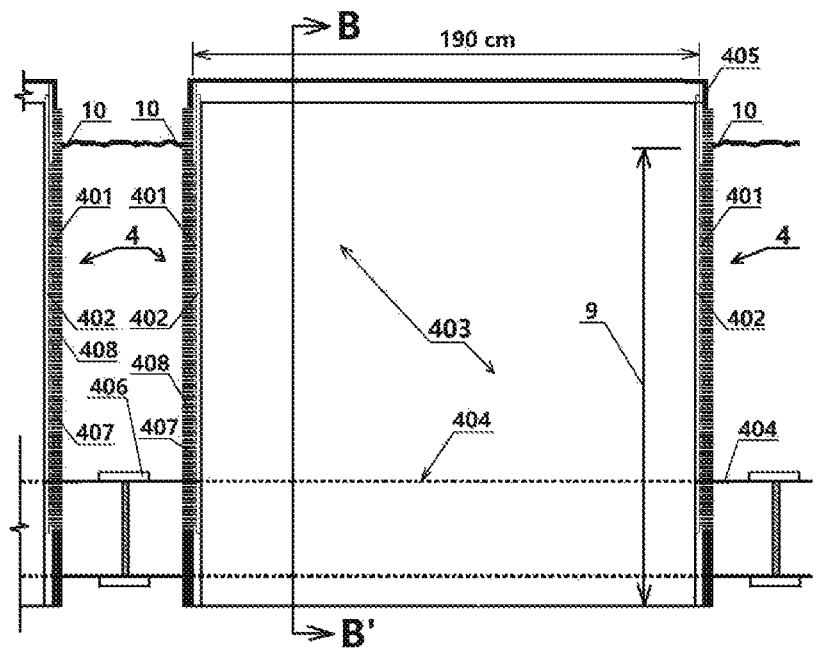
Figure 5A:
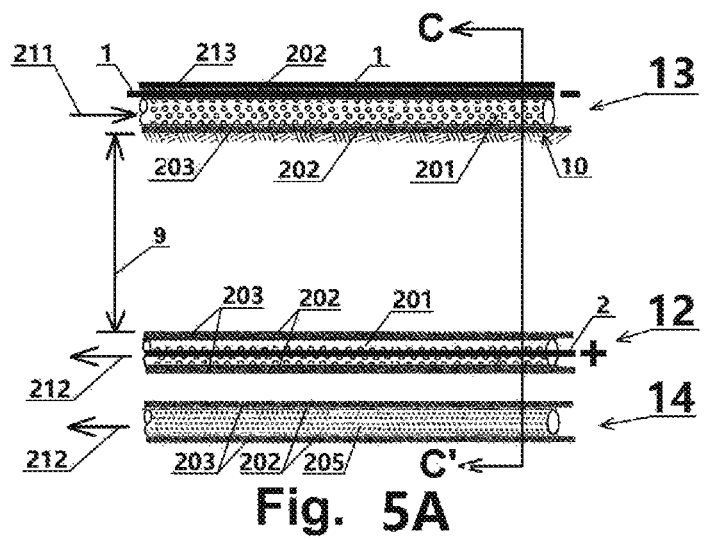
Figure 5B:
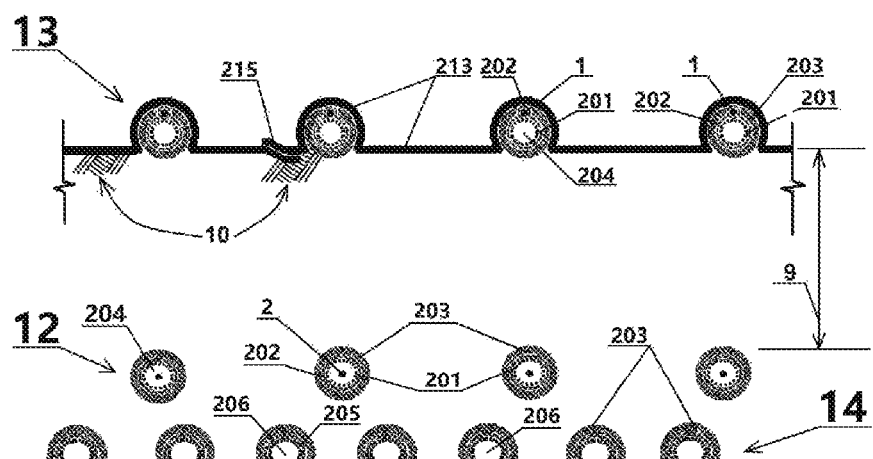

The leaching solution collection system 4 is a hollow panel shape design as shown in FIGS. 4A and 4B. FIGS. 4A and 4B shows that the hollow panel shape of the leaching solution collection system 4 is made of four porous walls 401. If the side length of the equilateral hexagon of the horizontal electrode and leaching solution supply or removal device 12 is selected at 4 m, then the one side length of the hexagonal design of the leaching solution collection system 4 is half of 4 m, i.e., 2 m. In this case the panel length of the leaching solution collection system 4 can be arranged at 190 cm and leave 10 cm gap for the panel connection, as shown in FIG. 4B. The width of the of the leaching solution collection system 4 is selected approximately at 10 cm as shown in FIG. 4A. A porous moisture control line 404 is provided near bottom of the panel gap to collect the leaching solution or used as a pipeline to provide acid solution for washing of the CEC and moisture control material 403, as will be further discussed later in this invention. The four walls of the leaching solution collection system 4 are wrapped on the outside surface in two layers of geotextiles, including one inside fine-pore geotextile 407 (which pore sizes are less than that of fine silt particles about 5 μm), and one outside coarse-pore geotextile 408 (which pore sizes are less than that of fine sand particles about 0.5 mm). A seal cap 405 is provided to maintain the leaching solution collection system 4 becomes a close system which can maintain a negative pressure. A flat sheet of ultrafiltration membrane 402 is attached to the inside four walls of the porous leaching solution collection system 4. The inside space of the leaching solution collection system 4 is filled with CEC and moisture control material 403. As shown in FIG. 4B, two leaching solution collection systems 4 can be connected together through the moisture control line 404 by a line connector 406. Rigid plastic material can be selected for the pre-fabrication of the leaching solution collection system 4. PVC pipe can be selected to pre-fabricate the moisture control line 404, which is porous inside the leaching solution collection system 4, but without perforation extending outside the leaching solution collection system 4 for connection of two systems. Oxidized cellulosic material or humic substances with high CEC values can be selected for the moisture control material 403 to fill the inside space of the leaching solution collection system 4. Since the pressure of the leaching solution collection system 4 can be adjusted negatively corresponding to the moisture contents in outside soils, it can be used not just to collect leaching solution and adsorption of sodium ion, but also can be used to adjust the soil moisture surrounding the system.

Detailed configurations of the horizontal electrode and leaching solution supply or removal device 12, the ground-surface horizontal electrode and leaching solution supply device 13, and moisture control sensor 14 are shown in FIGS. 2A, 2B, and 2C, respectively. As shown in FIGS. 2A and 2B, both the horizontal electrode and leaching solution supply or removal device 12, and the ground-surface horizontal electrode and leaching solution supply device 13 are constructed by 5 cm diameter perforated PVC casings 201, and are wrapped by at least two layers of geotextile material including one or more than one layer of fine-pore geotextile 202 (which pore sizes are less than that of fine silt particles about 5 μm), and one or more than one layer of coarse-pore geotextile 203 (which pore sizes are less than that of fine sand particles about 0.5 mm). The geotextile material is provided to screen out soil particles getting into the collection device and to protect the PVC casings and to avoid the requirement of installing fine sands and pea gravels for the casing installation in horizontal boreholes. The horizontal perforated PVC casing 201 is filled with leaching solution 204 during operation. When the horizontal PVC casing 201 is used to supply leaching solution, an appropriate positive pressure is applied. When the horizontal perforated PVC casing 201 is used to collect leaching solution, a negative pressure is applied. An electrode material is arranged either inside the horizontal perforated PVC casing 201, such as shown in FIG. 2A, or above the horizontal perforated PVC casing 201, such as shown in FIG. 2B. Either cathode or anode can be selected for the electrode material mentioned above depending on the arrangement of supply or removal of the leaching solution, and selection of types of leaching chemical(s). The ground-surface horizontal electrode and leaching solution supply device 13, as shown in FIG. 2B, is covered by a polymer liner 213. The polymer liner 213 can be extended to cover the entire ground surface where the ground-surface horizontal electrode and leaching solution supply device 13 is present, as shown in FIG. 5B. The ground-surface horizontal electrode and leaching solution supply device 13 can be prefabricated with suitable casing length and liner area for ease of shipping and installation in the field and also can be reused in another project. The prefabricated unit mentioned above can be connected together and sealed at the polymer liner edges 215 in the field. Provision of the liner to cover the entire area of the remediation surface is for the purposes of maintaining leaching solution pressure and preventing leaching solution evaporation. Maintaining a minimum pressure in the leaching solution supply lines are important to maintain the entire contaminated soils in saturated conditions.

Detailed configurations of the moisture control sensor 14 is shown in FIG. 2C. The device includes extra fine pores of perforated moisture control probe casing 205, negative-pressure leaching solution 206, and is wrapped by one or more than one layer of fine-pore geotextile 202 (which pore sizes are less than that of fine silt particles about 5 μm), and one or more than one coarse-pore geotextile 203 (which pore sizes are less than that of fine sand particles about 0.5 mm). The moisture control sensor 14 is provided to remove leaching solution in soils to control proper negative pressures below field capacity of soils below the impacted soil zone in order to prevent migration of leaching solution downward to pollute the soil strata and groundwater, if any, below the contaminated zone.

Details of the vertical electrode and leaching solution supply or removal device 15, as shown in FIG. 1B, are provided in FIG. 2D. The vertical electrode and leaching solution supply or removal device 15 is installed in a vertical borehole 207. The device includes a vertical perforated electrode casing 208, bentonite seals 209, an electrode material (either used as a cathode 1 or anode 2), leaching solution supply 211 or removal 212 lines, and electrode casing caps 214. Bentonite seals 209 are provided both at the bottom of the borehole 207 and near the ground surface in the borehole 207. The vertical perforated electrode casing 208 is constructed with PVC material and is wrapped by one or more than one layer of fine-pore geotextile 202, and one or more than one coarse-pore geotextile 203. The annular space of the borehole 207 is filled with fine sand or pea gravel 210.

Comparing between the two types of systems, type one system (shown in FIG. 1) is easier and cheaper to fabricate and install than that of the type two system. However, for shallow depths of soil reclamation, type two system (shown in FIGS. 5A and 5B) will be more effective and can remediate in a shorter time period.

3. Reclamation Systems for Metal Removal from Deep Contamination Soils

Figure 6:
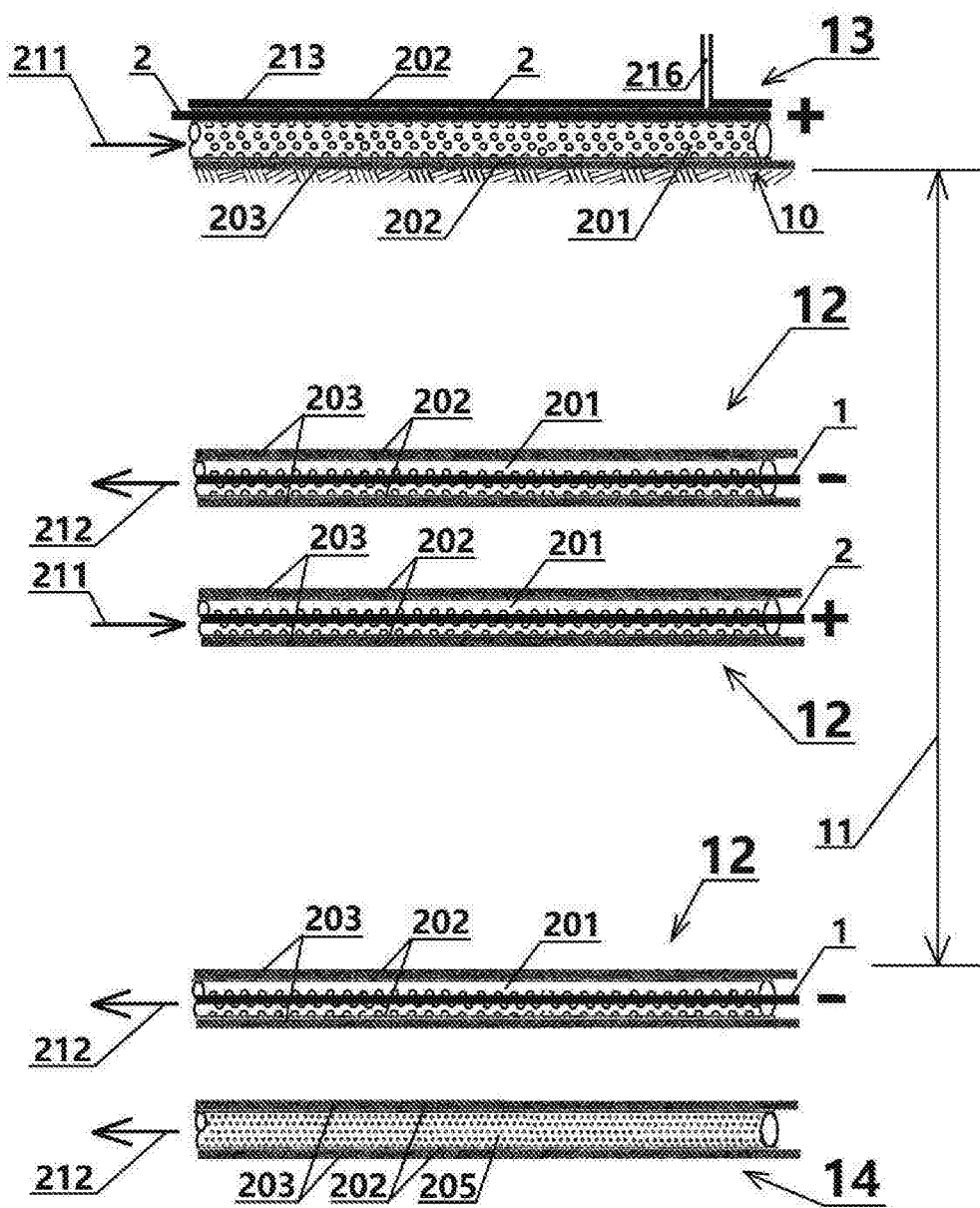
FIG. 6 shows the configuration of a deep (multi-level) horizontal design of the electrokinetic system in the present invention.

The deep decontamination system can be used when depth of impacted soils is greater than 2 m, as shown in FIG. 6. This system can be applied to impacted soils either the upper contamination zone is exposed to the ground surface, or the contamination zone is deep below the ground surface. FIG. 6 shows a system arrangement when contamination zone is exposed to ground surface. In this design, the ground-surface horizontal electrode and leaching solution supply device 13 is applied, similar to the system shown in FIGS. 5A and 5B. A gas vent 216 with a valve (not shown) can be provided for both shallow and deep design when gas is formed through reactions. The differences comparing to that of the system shown in FIGS. 5A and 5B, system used in FIG. 6 contains a multitude combinations of below-grade horizontal electrode and leaching solution supply or removal devices 12. In each level of the arrangement of the below-grade horizontal electrode and leaching solution supply or removal devices 12, an array of the device 12 is installed. The type of electrode (either cathode or anode) in each level of the device 12 can be alternated arranged depending on needs as well be further discussed later in this invention. As shown in FIG. 6, in the area below the contaminated soils, an array of moisture control sensor 14 is provided.

4. Leaching Solution, Sequential Extraction, Complexation and Electrokinetic Operation For in-situ extraction and removal of metals from subsurface soils, the following criteria are necessary before metal can be effectively and sufficiently leached out for removal: (1) metal species shall be in soluble forms (if in colloidal forms the particle sizes shall be small enough to migrate through the pore spaces in soils), (2) subsurface impacted soils shall be in saturation or near saturation conditions, (3) enough external forces are present to aid the migration of soluble and/or colloidal forms of metals, and (4) downward metal migration shall be prevented to avoid secondary pollution problem. In responding to the criteria (1) and (3) above, most practices for dissolution of metals from soil particles are applying ion-exchange, solubilization and/or complexation/chelating chemicals and using electrokinetic method for enhancement of metal removal. Traditionally, migration of soluble metal species is usually accomplished by hydraulic flow movement and gravity drain for metal removal. Surface flooding or ponding is frequently selected to maintain the subsurface soils in saturation condition to provide sufficient contacts between leaching solution and impacted soil particles. Most existing electrokinetic methods proposed so far are mainly for the enhancement of soluble metal migration in soils, however, moisture saturation conditions necessary for the entire soil impacted areas are usually not provided. Virtually no invention disclosed effective methods in the past for the prevention of secondary subsurface soil and groundwater pollution problems. In the present invention the following methods are provided to accomplish the above four necessary criteria.

For soil desalination, significant amount of both soluble and insoluble salt metal phases are co-existed in subsurface environments and shall be investigated before reclamation. Removal of soluble salts do not require the use of any leaching/extraction (dissolution, ion-exchange and/or complexation) chemicals. It is unnecessary and wasteful to add any extraction agent(s) for the removal of soluble salts. Since soluble salts are always existed in salt impacted soils, therefore, the first step for salt removal from soils can just use plain water leaching. When great majority of soluble salts are removed, leaching agent(s) are then needed to leach the insoluble salt metals. Complexation forces formed between sodium cations and soluble ligands are usually smaller than that of electric forces formed between sodium cations and negatively charged CEC particles. Due to insoluble salts, especially sodium metal, are mainly existed in CEC phase in soils, ion-exchange agent(s) will be more effective to get insoluble sodium out of the soil particles. Complexing/chelating agent(s) usually only can pull the CEC sodium out through complexation of free soluble sodium ion with soluble ligands as shown in Equation (2) above. Therefore, using ion-exchange agent(s) is more effective way for insoluble sodium salt removal. Ion-exchange agents can mix with other complexation agents to enhance the salt removal provided that these complexation agents will not reduce the exchange capacity of ion-exchange agents used. The following steps are disclosed for sodium desalination of the type 2 system (FIGS. 5A and 5B) discussed previously: (1) adding plain water through the surface device 13 as leaching solution and providing the electrokinetic method (with anode near the surface, and cathode locating below the bottom of impacted soils) until most soluble sodium salt is removed, (2) adding ion-exchange agents through the surface device 13 and continue soaking the soils for certain time period to replace out most insoluble sodium and simultaneously using the electrokinetic method (using anodes near the surface when cationic exchanger is adding, and cathodes locating below the bottom of impacted soils for soluble sodium ion attraction) to enhance the soluble salt removal, and (3) adding soluble humic substances and/or oxidized cellulosic materials, and humic nanoparticles as the complexation agents through the surface device 13 (converting the electrodes in the surface device 13 to cathodes), to ensure the sufficiency of salt removal and providing enough safeguard and better soil quality for future agricultural purposes. For sodic soil reclamation, the most cost-effective ion-exchange agent(s) are any easily soluble compounds and having two or more than two valence numbers of cations such as calcium, magnesium, or both. Calcium and/or magnesium compounds of nitrate, sulfate, or chloride salts are very soluble and are the best agents can be used for step (2) above. Among them, calcium and/or magnesium nitrates are most favorable compounds of concern due to their plant nutrient value when retained by soils. Other species discussed above including calcium, and magnesium sulfates are also secondary nutrients for plants and their use, if retained by soils, will not be wasted.

The steps used for type 1 system (FIGS. 1A to 1C) will be more complicated as shown below: (1) using both the below-grade horizontal electrode and leaching supply or removal device 12 and the vertical electrode and leaching solution supply or removal device 15 as the plain water injection devices to add water for soaking purpose, and using the leaching solution collection system 4 to collect and recirculate water (in this situation sodium ions are adsorbed by the CEC and moisture control material 403), (2) adding ion-exchange agents through both devices of the below-grade horizontal electrode and leaching supply or removal device 12 and the vertical electrode and leaching solution supply or removal device 15, and continue soaking the soils for certain time period to replace out most insoluble sodium, (3) using the electrokinetic method, converting anode near the surface device 12, when cationic exchanger is adding, and cathode for the vertical electrode and leaching solution supply or removal device 15 to enhance the soluble salt removal, (4) using acid solution such as $HNO_3$ to wash and leach out adsorbed sodium ion in the leaching solution collection system 4, and (5) adding soluble humic substances and/or oxidized cellulosic materials, and humic nanoparticles as the complexation agents through the surface device 12 (converting the electrodes in the surface device 12 to cathodes), to ensure the sufficiency of salt removal and providing enough safeguard and better soil quality for future agricultural purposes. For sodic soil reclamation, the most cost-effective ion-exchange agent(s) are any soluble compounds of calcium, magnesium, or both as discussed above.

From the existing chemical complexation information, it is found that no significant complexes are formed between sodium ion and inorganic ligands. The complexes formed between sodium ion and organic ligands are also relatively weak, possibly due to forces between sodium cation and organic ligands are in ionic bonds which are relatively weaker than that of covalent bonds. Important organic ligands of sodium reported in the open literature include EDTA (log stability constant=1.66), NTA (2.15), CyDTA (2.70), GEDTA (1.38) and humic substances, as shown in Table 2 to be discussed later. The formation constant between sodium ion and humic substances will be affected by type and source of the humic substances. Although information for sodium ion and humic substances are greaterly lacking in the open literature, however, very high CEC values of humic substances are widely repported (e.g., Wikipedia: Cation Exchange Capacity; Pettit: Organic Matter, Humus, Humate, Humic Acids, Fulvic Acids and Humin, Texas A&M, 2008). The CEC values for humin (MW 10,000,000), humic acids (MW 100,000), and fulvic acids (MW from 1000 to 10,000) were found in the following values 100, 300, and 500 to 1000 c mole/Kg, respectively. A CEC value of 500 c mole/Kg will be equivalent to about log formation constant of 2.7 for sodium ion with humic substances, which is higher than that of most sodium-organic complexes mentioned above. In comparison to most colloidal soil particles, the CEC values are usually less than 50. Therefore, use of soluble forms and/or nanoparticles of humic substances and/or oxidized cellulosic materials will be very effective in terms of complexation effects and CEC effects for insoluble sodium removal. The soluble forms of humic substances can form complexes with free sodium ion according to Equation (2) above, to deplete the concentration of free soluble sodium ion in order to dissolve more sodium from the insoluble phase. The nanoparticle forms of humic substances and/or oxidized cellulosic materials, due to their high CEC values, can compete with the colloidal particles of soils to pull sodium to the surface of the nanoparticles from soils. In order to migrate nanoparticles in the soil solution for sodium removal, the sizes of nanoparticles mentioned above shall be in the range of 50 to 1000 nm, preferably in the range of 50 to 500 nm. Use of nanoparticles for sizes less than 50 nm, in future agricultural use of the land, shall be avoided due to the possible uptake by plant roots which the root membrane pore sizes in the 20 to 50 nm range were reported.

For heavy metal remediation, concentrations of soluble metals in soil solution are usually very low and majority of heavy metals in soils are co-existed in four phases as discussed above. Partitioning of heavy metal phases in impacted soils can be laboratory tested before remediation by extraction methods reported in the open literature. Some of these phases are existed more often on the soil particle surface, such as the CEC and reducible phases. Some of the phases may be trapped deep in the soil particles, such as oxidizable and lithogenic phase. To remove different phases of heavy metals require different extraction chemicals. Sequential extraction is necessary to effectively remove different phases of heavy metals from soils.

Heavy metals in CEC phase are usually existed on the surface of soil particles, as shown in FIGS. 3B and 3C, and can be removed first. For soil remediation purpose, the following chemical agents can be used for heavy metal extraction/removal from CEC phase: ammonium acetate, ammonium acetate and ammonium hydroxide mixture, citric acid, nitrate and/or chloride of calcium or magnesium, ammonium citrate, ammonium oxalate, dilute mineral acids, ethylene diamine, and ethylene diamine di(0-hydroxyphenyl acetic acid), or mixtures of above. The dissolution of heavy metals is a slow process, so soaking of these extraction agent(s) in soils are necessary before applying electrokinetic method to enhance the extraction and heavy metal migration for removal. The soaking time requirement can be laboratory tested. For effective dissolution of the CEC phase, more than one day of soaking time is necessary. Soaking operation shall be conducted in the moisture saturation condition. In each step of sequential extraction, the soluble forms of heavy metals can be remove separately with the addition of metal complexation agent(s) and applying the electrokinetic operation. Removal of soluble heavy metals also can be wait until other phase extraction operations are completed and all soluble heavy metals removed together with the add of complexation agent(s) and electrokinetic method. Table 2 shows the applicable complexation agents can be used together with the electrokinetic operation. Higher formation constant value represents stronger and higher concentration of complex formation. Since adding humic substances can also assist the agricultural production so should be favorably considered if the remediated area will be used for agriculture purposes. The inorganic ligands usually are not strong complexation agents for metals and are not favorable for selection. Organic ligands, in addition to humic substances, can be selected dependent on the type of metal(s) and their formation constants, costs, toxicity concern, and interference with other species in soils. The following complexation agents can be used: humic acids, fulvic acids, nanoparticles of humic substances, EDTA, NTA, CyDTA, DTPA, EDTA-OH, GEDTA, TTHA, and Me-EDTA.

TABLE 2

Applicable Complexation Agents and
Overall Formation Constants for Soluble Metals
(Data in log K, only $\beta_1$ shown for inorganic ligands, data not shown
representing data not available or complex not found)

| Metal | Humic Acids | Fulvic Acids | Cl⁻ | OH⁻ | EDTA | NTA | CyDTA | DTPA | EDTA-OH | GEDTA | TTHA | Me-EDTA |
|---|---|---|---|---|---|---|---|---|---|---|---|---|
| Ca(II) | | | | | 10.96 | 6.41 | 12.50 | 10.74 | 8.14 | 11.00 | 10.06 | 10.40 |
| Cd(II) | 6.25 | | 2.69 | 6.08 | 16.48 | 9.54 | 19.23 | 19.31 | 13.60 | 16.70 | 18.65 | 16.00 |
| Cr(III) | | | 0.60 | 10.63 | 13.61 | | | | | | | |
| Cu(II) | 5.97 | 5.96 | 1.58 | 6.0 | 18.80 | 12.96 | 21.30 | 21.53 | 17.35 | 17.80 | 19.20 | 17.70 |
| Fe(II) | 5.84 | 5.93 | 0.38 | 6.10 | 14.33 | 8.84 | 16.27 | 16.55 | 12.20 | 11.92 | 17.10 | 14.30 |
| Hg(II) | | | 7.20 | 10.80 | 21.80 | 14.60 | 24.30 | 27.00 | 20.10 | 23.12 | 26.80 | 21.70 |
| Mg(II) | | | | | 8.69 | 5.46 | 10.32 | 9.30 | 7.00 | 5.21 | 8.10 | 8.80 |
| Mn(II) | 5.94 | 6.01 | 1.08 | 3.82 | 14.04 | 7.44 | 16.78 | 15.60 | 10.70 | 12.30 | 14.68 | 14.50 |
| Na(I) | | | | 8.0 | 1.66 | 2.15 | 2.70 | | | 1.38 | | |
| Ni(II) | | 4.50 | 0.72 | 4.70 | 18.62 | 11.54 | 19.40 | 20.32 | 17.00 | 13.60 | 18.10 | 14.20 |
| Pb(II) | 8.35 | | 1.60 | 6.73 | 18.04 | 11.39 | 19.68 | 18.80 | 15.50 | 14.71 | 17.10 | 17.30 |
| Zn(II) | 4.20-10.83 | 8.88-9.30 | 0.43 | 4.40 | 16.50 | 10.66 | 18.67 | 18.75 | 14.50 | 14.50 | 16.65 | 16.20 |

The next sequential extraction operation is to dissolve the oxidizable or reducible phase for heavy metal removal. If oxidizable phase of heavy metal extraction is operated first, the metal species may convert to reducible phase during the soaking period. However, if reducible is operated first, then after the next oxidizable extraction, reducible extraction may have to apply again. In view of this situation, it is more favorable to apply the oxidizable phase extraction first. For soil remediation purpose, the following chemical agents can be used for dissolution of heavy metal from the oxidizable phase: $H_2O_2$, $H_2O_2$ in dilute $HNO_3$, sodium hypochlorite, $H_2O_2$ with $NH_4Ac$ and $HNO_3$. Again, for effective dissolution of the oxidizable phase, more than one day of soaking time is necessary. The soaking time requirement can be laboratory tested. Soaking operation shall be conducted in the moisture saturation condition. Since some metal species may convert to the reducible phase after the extraction of the oxidizable phase, the complexation operation shall be applied after dissolution of metals in reducible phase is done.

The next sequential extraction operation is to remove metals in the reducible phase. For soil remediation purpose, the following chemical agents can be used for dissolution of heavy metal from the reducible phase: acetic acid (HAc), ammonium acetate and hydroquinone mixture, mineral acids (HCl, $HNO_3$, $H_2SO_4$), sodium dithionite, sodium dithionite and sodium citrate mixture, oxalic acid, oxalic acid and ammonium oxalate mixture, acid and EDTA mixture, $NH_2OH \cdot HCl$, $NH_2OH \cdot HCl$ and HAc mixture, and $NH_2OH \cdot HCl$ and $HNO_3$ mixture. Again, for effective dissolution of the reducible phase, more than one day of soaking time is necessary. The soaking time requirement can be laboratory tested. Soaking operation shall be conducted in the moisture saturation condition. After soaking operation, the complexation and electrokinetic operations can be applied to remove the soluble metals. The complexation agents as discussed above can be used.

The sequential extraction for metals in lithogenic phase is not necessary. This type of metal compounds are very inert in the environment. Lithogenic metals are not considered pollutants and can be left in the soil environments.

The locations and application methods for the addition and removal of leaching solutions (i.e., sequential extraction agents and complexation agents) are also critical for the effectiveness of metal remediation. Criteria for leaching solution addition and removal are: (1) addition of leaching solution at higher location on site so impacted soils at higher elevation can be contacted by solution, saturation can be more easily accomplished, and migration of solution can be assisted by gravity, (2) when ionic leaching solution is added, such as adding calcium ion or ionic complexation agents, the type of electrode in the leaching solution supply device shall be the same charge as the leaching solution, i.e., when adding cationic leaching solution such as calcium ion, the anode (positive electrode) in the device shall be selected, and (3) appropriate pressures (to be further discussed later in this invention) shall be maintained during extraction, soaking, complexation, and leaching solution removal periods so soils can maintain in saturation conditions and migration beyond the bottom contaminated zone will not occur, as will be further discussed below.

Figure 8A:
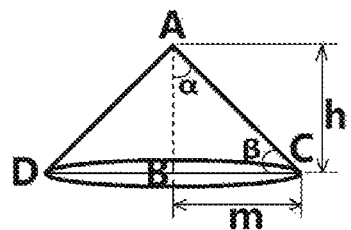
Figure 8B:
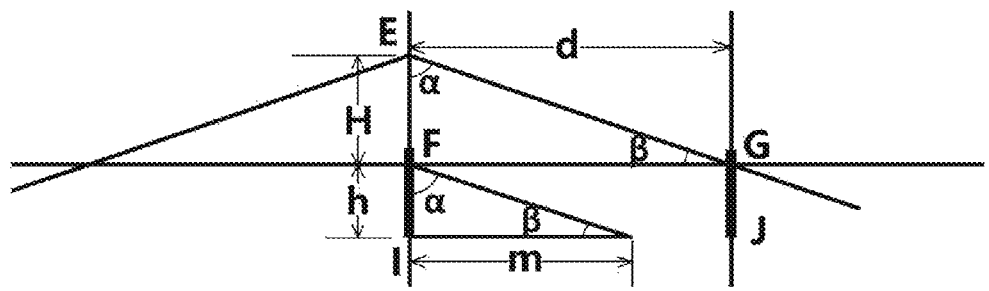

5. Soil Moisture Maintenance, Pressure Requirements, Pollution Prevention, and Expedition of Remediation Time Period Maintenance of suitable moisture contents in soils are necessary for the success of in-situ remediation. Soils in the remediation zone shall be maintain at or near saturation in order for leaching solution to contact the impacted soils. Saturation condition in soils is difficult to control especially near the surface and away from the leaching solution supply source. In general, when moisture contents in soils are higher than the field capacity the water will be drain away by gravity. When the leaching solution addition rates to soils are smaller than the moisture movement rates (or permeability times hydraulic gradient based on Darcy's Equation) in soils, saturation also cannot be maintained. Leaching solution, supplying by vertical electric wells or horizontal leaching supply lines, will migrate downward and the leachate plume will gradually spread out roughly according to the ratio of $K_H/K_V$ (horizontal permeability vs. vertical permeability), as shown in FIG. 8A. If the collection wells are outside the leachate plume they are not able to collect the leaching solution. FIG. 8A shows that the leaching solution spreading out angle $\alpha$ can be solved as $\tan^{-1}(K_H/K_V)$. As shown in FIG. 8B, if the vertical well FI is the leaching solution supply well and GJ is the leaching solution collection well, in order to maintain the soils in saturation near ground surface FG, extra hydraulic head EF (or H) shall be maintained. This hydraulic head can be calculated (as illustrated in FIG. 8B):

$$H = d/\tan \alpha = d(K_V/K_H) \qquad (4)$$

Where d=distance between leaching solution supply and collection devices.

For example, if d=4 m, and $K_V/K_H=\frac{1}{3}$, H can be calculated=1.33 m of hydraulic head needed, or equivalent to 1.96 psi of gauge pressure needed above atmospheric pressure (i.e., 16.7 psi of absolute pressure). If the injection pressure of the leaching solution is less than 16.7 psi, in this case, saturation condition for soils near surface can not be maintained, and collection well may miss the leachate plume also.

On the contrary, saturation condition shall not be maintained near the bottom of the impacted soils in order to avoid draining of leaching solution downward to pollute the soil strata below. The present invention discloses the use of negative pressures in soil solution corresponding to the moisture contents for the prevention of secondary pollution. The moisture contents right below the bottom of impacted soils shall be maintained at near or below the field capacity in order to prevent downward movement of leaching solution. The calibration curve of moisture contents vs. negative pressures can be developed by sampling and laboratory analysis. For many types of soil, the field capacity is near 50% of saturation, or close to $-\frac{1}{3}$ bars of soil-water potential. The negative pressure of the moisture control sensor 14 discussed previously can be adjusted to or less than the negative pressure of field capacity to prevent the downward movement of leaching solution.

As reported by many in-situ desalination and heavy metal remediation projects and inventions, weeks to months or even over a year of reclamation time period are required to complete the projects. Traditionally, the electrokinetic technology is one of the remediation enhancement methods used to increase the effectiveness and shorten the remediation time period. However, the remediation periods are still too lengthy and should be further expedited. With the addition of electrokinetic method, providing enough of electric potential gradients in soils beyond 0.5 v/cm, this invention further use the following methods for expedition of remediation: (1) increase of hydraulic gradient for leaching solution addition, (2) installation of one or more than one of leaching solution collection system 4, (3) selection of stronger, more effective, and higher concentrations of leaching agent(s), and (4) providing enough contact opportunity and time period for the dissolution of insoluble metal species into the soil pore solution. The minimum hydraulic gradient required, as shown in FIG. 8B, is H/d. If H is doubled, the migration rate of leaching solution in soils will be doubled also based on Darcy's Equation. In this case the soluble metal migration rate will be doubled also to shorten the remediation period. If one leaching solution collection system 4 is provided in between the leaching solution supply and removal devices (as shown in FIGS. 1A to 1C), theoretically, the remediation period will be shorten in half also. When stronger dissolution chemical(s) and higher formation constants of complexation ligand(s) are used the remediation period can be shorten also.

6. Leaching Solution Control System

Desalination and heavy metal remediation require suitable control systems to supply and remove leaching solutions at pre-determined pressure, quantity, flow rate and concentration conditions. In arid and semi-arid areas reuse of the leaching solutions shall be also provided. A well planned leaching solution control system is important for the success of the remediation project.

Minimum three types of leaching solution control system may be needed: (1) soil moisture control system 16, (2) leaching solution supply control system 17, and (3) leaching solution removal control and treatment system 18. Illustrative diagrams of these three systems are shown in FIGS. 7A and 7B.

Figure 7A:
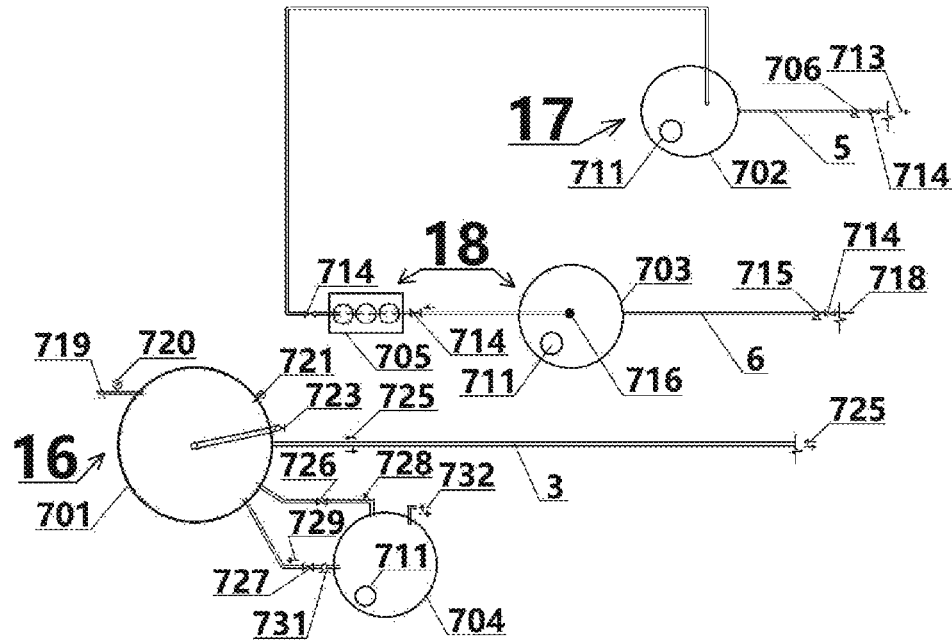
Figure 7B:
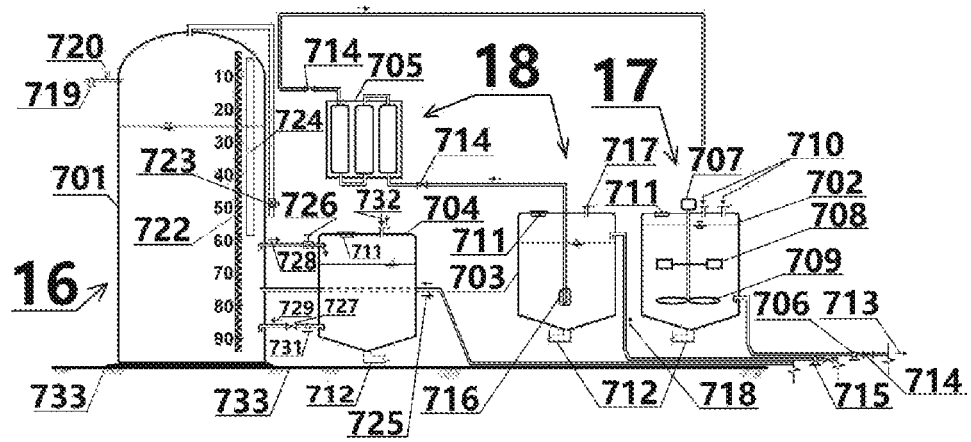

The soil moisture control system 16, as shown in FIGS. 7A and 7B, is provided to control moisture contents in soils so migration of pollutants can be controlled. The soil moisture control system 16 includes the following major equipments: a soil moisture control tank 701, a pressure equalization tank 704, a vacuum pump 719, a pressure gage 720, a tank air volume pressure indicator 721, a tank water volume indicator 722, a pressure increase valve 723, a water level observation tube 724, a water output valve 726, a water input valve 727, a water input pump 731, and a soil moisture control line 3. In operation, the soil moisture control line 3 is connected to a plurality of the moisture control sensors 14, as shown FIGS. 1A to 1C, 5A and 5B, and 6. A vacuum pressure is applied to the soil moisture control line 3 and the plurality of the moisture control sensors 14 by the soil moisture control tank 701. For automatic control of the soil moisture in the surrounding areas of the moisture control sensors 14, the vacuum pressure in the soil moisture control tank 701 can be preset at a certain value of vacuum (negative) pressure. For example, if the field capacity of the soils near the bottom of the contaminated site is equivalent to negative pressure of, say $\frac{1}{3}$ bar, the pressure in the soil moisture control tank 701 may be controlled at any values less than this $\frac{1}{3}$ bar pressure. In this case, if the moisture contains in soils near the control sensors 14 is greater than $\frac{1}{3}$ bar, the moisture will be sucked into the moisture control sensors 14 automatically. This extra water moisture removed by the moisture control sensors 14 will flow back into the tank 701, as shown in the soil moisture control flow 725. The pressure equalization tank 704 is provided to adjust the vacuum requirement in the soil moisture control tank 701. If the water stored in the pressure equalization tank 704 will be recycled and reused, a water treatment facility (not shown) shall be provided, similar to the water purification system 705 discussed in the leaching solution removal control system 18. When needed, the pressure equalization tank 704 can connect to the leaching solution supply control system 17 to reuse the water through supply/removal flow 732 shown. A sump pump (not shown) can be provided in the pressure equalization tank 704 for this purpose. The soil moisture control tank 701 and the pressure equalization tank 704 can sit on the ground surface 733, or hold by steel frames for easy to clean by a drain 712. The vacuum pressure in the soil moisture control tank 701 also can be controlled manually by using water output valve 726 and water input valve 727 to control the water input flow 729 and water output flow 728.

The leaching solution supply control system 17 is provided to supply leaching solutions for the remediation, as shown in FIGS. 7A and 7B. The leaching solution supply control system 17 includes the following major equipments: a leaching solution supply tank 702, a leaching solution supply line 5, and other necessary chemical preparation equipments (not shown), mixing devices (including a motor 707, a horizontal mixer 708, a vertical mixer 709), leaching solution supply pump 706, flow control valve 714, and a leaching solution supply line 5. A manhole 711 is provided for maintenance purpose. The leaching chemicals can be inputted through openings 710 as shown. The leaching solution also can be recycled from the leaching solution removal control system 18 as shown in FIG. 7A. The leaching solution supply flow 713, through the leaching solution supply line 5, is pumped to the below-grade horizontal electrode and leaching solution supply/removal device 12, or the ground-surface horizontal electrode and leaching solution supply device 13, or the vertical electrode and leaching solution supply/removal device 15, as needed shown in FIGS. 1A to 1C, 5A and 5B, and 6.

The leaching solution removal control system 18, as shown in FIGS. 7A and 7B, includes the following major equipments: a leaching solution removal tank 703, a leaching solution removal line 6, a water purification system 705, and accessory equipments including a sump pump 716, a leaching solution removal pump 715, chemical input opening 717, and a flow control valve 714. The leaching solution removal flow 718 is pumped from the below-grade horizontal electrode and leaching solution supply/removal device 12, or the vertical electrode and leaching solution supply/removal device 15, or the leaching solution collection system 4 (through moisture control probe/line 404), as shown in FIGS. 1A to 1C, 4A and 4B, 5A and 5B, and 6. The water purification system 705 can be provided based on types of contaminants to be removed before reuse of the leaching water. For example, if for desalination situation the sodium ion shall be removed. In this situation ion-exchange method or membrane process can be used. For heavy metal removal, many of the conventional treatment processes such as ion-exchange, adsorption, and/or membrane processes can be used. The treated water can be pumped to the leaching solution supply control system 17 for reuse.

Principles, methods and major apparatus are described above to explain the subject invention. It will be apparent to one of ordinary skill in the art that many changes and modifications can be made thereto without departing from the spirit or scope of the appended claims.

I claim:

1. A rapid metal reclamation system for soil desalination and remediation of heavy metal and radionuclide contamination, comprising:
   an electrokinetic system comprising electrode and leaching solution supply and removal devices for dissolving and complexing with metals in a leaching solution for removing metals from soils and enhancing migration rates of the metals,
   soil saturation condition maintaining devices for providing sufficient contacts between the leaching solution and soil particles in an impacted soil zone,
   a pollution prevention device for controlling moisture contents below field capacity of soils right below the impacted soil zone,
   devices for shortening reclamation time period, and
   a leaching solution control system for preparing, supplying, removing, purifying, recycling, and controlling moisture contents of the leaching solution.

2. The rapid metal reclamation system of claim 1, wherein the system comprises a plurality of below-grade horizontal electrode and leaching solution supply or removal devices 12 and a plurality of horizontal moisture control sensors 14.

3. The rapid metal reclamation system of claim 2, wherein the system further comprises a plurality of ground-surface horizontal electrode and leaching solution supply devices 13.

4. The rapid metal reclamation system of claim 3, wherein the leaching solution control system is for metal removal from shallow contamination depths of less than 2 m.

5. The rapid metal reclamation system of claim 2, wherein the system further comprises a plurality of vertical electrode and leaching solution supply or removal devices 15 and a plurality of leaching solution collection systems 4, and the leaching solution control system is for metal removal from shallow contamination depths of less than 2 m.

6. The rapid metal reclamation system of claim 3, wherein the electrokinetic system further comprises a plurality of below-grade horizontal electrode and leaching solution supply or removal devices 12 arranged in an array, and the leaching solution control system is for metal removal from contamination depths of more than 2 m.

7. The rapid metal reclamation system of claim 2, wherein the below-grade horizontal electrode and leaching solution supply or removal device 12 is constructed of a 5 cm diameter perforated PVC casing 201, wrapping by at least two layers of geotextile material including one or more than one layer of fine-pore geotextile 202 having pore sizes are less than that of fine silt particles about 5 µm, and one or more than one layer of coarse-pore geotextile 203 having pore sizes are less than that of fine sand particles about 0.5 mm and filling with leaching solution 204 during operation, with a positive pressure applying to the device to supply leaching solution and a negative pressure to remove leaching solution, and an electrode material arranging inside the horizontal perforated PVC casing 201 to generate electric field necessary for an electrokinetic method.

8. The rapid metal reclamation system of claim 3, wherein the ground-surface horizontal electrode and leaching solution supply device 13 is constructed of a 5 cm diameter perforated PVC casing 201, wrapping by at least two layers of geotextile material including one or more than one layer of fine-pore geotextile 202 having pore sizes are less than that of fine silt particles about 5 µm, and one or more than one layer of coarse-pore geotextile 203 having pore sizes are less than that of fine sand particles about 0.5 mm and filling with leaching solution 204 during operation, with enough positive pressure applying to the device to supply leaching solution and to maintain soils in the impacted zone in saturation condition, an electrode material arranging above the horizontal perforated PVC casing 201 to generate electric field necessary for the electrokinetic method, and covering by a polymer liner 213 on the ground surface throughout the contaminated area for maintaining a minimum pressure in the leaching solution supply lines and maintaining the entire contaminated soils in saturated conditions.

9. The rapid metal reclamation system of claim 2, wherein the moisture control sensor 14 is constructed of an extra fine pores of perforated moisture control probe casing 205, and wrapping by one or more than one layer of fine-pore geotextile 202 having pore sizes are less than that of fine silt particles about 5 µm, and one or more than one coarse-pore geotextile 203 having pore sizes are less than that of fine sand particles about 0.5 mm, filling with negative-pressure leaching solution 206 in the casing to remove leaching solution in soils to control proper negative pressures below field capacity of soils locating below the impacted soil zone to prevent migration of leaching solution downward to pollute the soil strata and groundwater below contaminated zone.

10. The rapid metal reclamation system of claim 5, wherein the vertical electrode and leaching solution supply or removal device 15 is installed in a vertical borehole 207, including a vertical perforated electrode casing 208 wrapping by one or more than one layer of fine-pore geotextile 202, and one or more than one coarse-pore geotextile 203, an electrode material either used as a cathode 1 or anode 2, leaching solution supply 211 or removal 212 lines, electrode casing caps 214, bentonite seals 209, and filling with fine sand or pea gravel in the annular space of the borehole 207.

11. The rapid metal reclamation system of claim 5, wherein the leaching solution collection system 4 comprises
 a hollow panel shape design with four porous walls 401 surrounding the panel,
 two layers of geotextiles outside the four porous walls, having one inside fine-pore geotextile 407 having pore sizes are less than that of fine silt particles about 5 µm, and one outside coarse-pore geotextile 408 having pore sizes are less than that of fine sand particles about 0.5 mm,
 a flat-sheet of ultrafiltration membrane 402 attaching inside of the four porous walls,
 a porous moisture control line 404 providing near bottom of the panel gap to collect the leaching solution or to provide acid solution for washing,
 a CEC and moisture control material 403 for removal of metals or for controlling negative pressure for adjusting moisture contents in the surrounding soils, and
 a seal cap on top of the design to maintain the system as a closed system.

12. The rapid metal reclamation system of claim 2, wherein the leaching solution control system comprises
 a soil moisture control system 16,
 a leaching solution supply control system 17, and
 a leaching solution removal control and treatment system 18.

13. The rapid metal reclamation system of claim 12, wherein the soil moisture control system 16 comprises:
 a soil moisture control tank 701,
 a pressure equalization tank 704,
 a vacuum pump 719,
 a pressure gage 720,
 a tank air volume pressure indicator 721,
 a tank water volume indicator 722,
 a pressure increase valve 723,
 a water level observation tube 724,
 a water output valve 726,
 a water input valve 727,
 a water input pump 731, and
 a soil moisture control line 3 connecting to a plurality of the moisture control sensors 14, for automatic control of the soil moisture in the surrounding areas of the moisture control sensors 14.

14. The rapid metal reclamation system of claim 12, wherein the leaching solution supply control system 17 comprises:
 a leaching solution supply tank 702,
 a leaching solution supply line 5,
 chemical preparation equipments,
 mixing devices comprising a motor 707, a horizontal mixer 708, a vertical mixer 709,
 a leaching solution supply pump 706,
 a flow control valve 714, and
 a leaching solution supply line 5 connecting to the below-grade horizontal electrode and leaching solution supply/removal device 12,
 optionally a ground-surface horizontal electrode and leaching solution supply device 13 or a vertical electrode and leaching solution supply/removal device 15.

15. The rapid metal reclamation system of claim 12, wherein the leaching solution removal control system 18 comprises:
 a leaching solution removal tank 703,
 a water purification system 705,
 accessory equipments comprising a sump pump 716, a leaching solution removal pump 715, chemical input opening 717, a flow control valve 714, and
 a leaching solution removal line 6 connecting to the below-grade horizontal electrode and leaching solution supply/removal device 12,
 optionally a vertical electrode and leaching solution supply/removal device 15 or a leaching solution collection system 4.

16. A method for in-situ soil reclamation of metal contamination by using the rapid metal reclamation system of claim 1, comprising
 (1) increasing pumping pressure through a leaching solution supply line 5 to supply of leaching solution with a minimum gauge pressure equivalent to hydraulic head $d(K_V/K_H)$, where d is a distance between the leaching solution supply and collection devices, $K_V$ is a vertical permeability of soil, and $K_H$ is a horizontal permeability of soil to saturate an entire soil impacted zone,
 (2) increasing the pumping pressure several times higher than the minimum gauge pressure to increase hydraulic flow rates estimated by Darcy's equation and increasing soluble metal species migration rates,
 (3) increasing electric potential gradients by the electrokinetic system beyond 0.5 v/cm in impacted soil to enhance migration of ionic species of metal compounds,
 (4) installing one or more leaching solution collection system 4 to shorten a migration distance of metal species and effectively removal of contaminants for recycling of leaching solution when the metal contamination depth is less than 2 m,
 (5) selecting and using a leaching solution to expedite dissolution of metal species in soils, and
 (6) providing enough contact and time for dissolving insoluble metal species into a soil pore solution.

17. The method for in-situ soil reclamation of metal contamination of claim 16, wherein the metal is sodium, further comprising
 (1) using a type one system comprising a vertical electrode and leaching solution supply or removal device 15, a below-grade horizontal electrode and leaching solution supply or removal device 12, the leaching solution collection system 4, and a horizontal moisture control sensor 14, comprising the steps of:
 (i) using the below-grade horizontal electrode and leaching solution supply or removal device 12 and the vertical electrode and leaching solution supply or removal device 15 as plain water injection devices to add water for soaking purpose, and using the leaching solution collection system 4 to collect and recirculate water,
 (ii) adding ion-exchange agents through the below-grade horizontal electrode and leaching supply or removal device 12 and the vertical electrode and leaching solution supply or removal device 15, and continue soaking the soils to replace out most insoluble sodium,
 (iii) using the electrokinetic system and converting the electrode as an anode in the below-grade horizontal electrode and leaching solution supply or removal device 12 and converting the below-grade horizontal electrode and leaching solution supply or removal device 12 as a cationic exchanger adding device, and converting the electrode as a cathode in the vertical electrode and leaching solution supply or removal device 15 and converting the vertical electrode and leaching solution supply or removal device 15 as a leaching solution removal device to enhance the soluble salt removal, (iv) using an acid solution to wash and leach out adsorbed sodium ion in the leaching solution collection system 4, and (v) adding soluble humic substances and/or oxidized cellulosic materials, and humic nanoparticles as complexation agents through the below-grade horizontal electrode and leaching solution supply or removal device 12 and converting the electrodes in the below-grade horizontal electrode and leaching solution supply or removal device 12 to cathodes, to ensure sufficiency of salt removal and providing safeguard and better soil quality for future agricultural purposes, or alternatively, (2) using a type two system comprising a below-grade horizontal electrode and leaching solution supply or removal device 12, a ground-surface horizontal electrode and leaching solution supply device 13, and a moisture control sensor 14, comprising (i) adding plain water through the ground-surface horizontal electrode and leaching solution supply device 13 as leaching solution and providing the electrokinetic system with anode near the surface, and cathode locating below the bottom of impacted soils to remove soluble sodium salt, (ii) adding ion-exchange agents through the ground-surface horizontal electrode and leaching solution supply device 13 and continue soaking the soils to replace out most insoluble sodium and simultaneously using the electrokinetic system using anodes near the surface when cationic exchanger is adding, and cathodes locating below the bottom of impacted soils for soluble sodium ion attraction to enhance soluble salt removal, and (iii) adding soluble humic substances and/or oxidized cellulosic materials, and humic nanoparticles as complexation agents through the ground-surface horizontal electrode and leaching solution supply device 13 by converting the electrodes in the ground-surface horizontal electrode and leaching solution supply device 13 to cathodes, to ensure salt removal and provide safeguard and better soil quality for future agricultural purposes, and wherein the humic nanoparticles have a size in a range of 50 to 1000 nm.

18. The method of claim 17, wherein the ion-exchange agents comprise soluble cations or combination of soluble cations having two or more valance numbers of cations, and
the complexation agents comprise organic including EDTA, NTA, CyDTA, GEDTA, and humic substances having a log stability constant of 2.7 or more.

19. The method for in-situ soil reclamation of metal contamination of claim 16, wherein the metal contamination is heavy metal remediation, and the step (5) of the method further comprises (1) extracting heavy metals in CEC phase in soils by a leaching chemical agent that is ammonium acetate, a mixture of ammonium acetate and ammonium hydroxide, citric acid, nitrate and/or chloride of calcium or magnesium, ammonium citrate, ammonium oxalate, dilute mineral acids, ethylene diamine, ethylene diamine di(0-hydroxyphenyl acetic acid), or a mixture thereof, (2) sequentially extracting heavy metals comprising heavy metals in oxidizable phase in soils by a leaching chemical agent that is $H_2O_2$, $H_2O_2$ in dilute $HNO_3$, sodium hypochlorite, $H_2O_2$ with $NH_4Ac$, $HNO_3$, or a combination thereof, (3) sequentially extracting heavy metals comprising heavy metals in reducible phase in soils by a leaching chemical agent that is acetic acid (HAc), ammonium acetate and hydroquinone mixture, mineral acids (HCl, $HNO_3$, $H_2SO_4$), sodium dithionite, sodium dithionite and sodium citrate mixture, oxalic acid, oxalic acid and ammonium oxalate mixture, acid and EDTA mixture, $NH_2OH.HCl$, $NH_2OH.HCl$ and HAc mixture, $NH_2OH.HCl$ and $HNO_3$ mixture, or a combination thereof.

20. The method for in-situ soil reclamation of metal contamination of claim 19, further comprising (1) soaking for more than one day of time right after adding each sequential extraction agent, or for a laboratory tested time required for soaking that is needed for near complete removal of each metal phase, (2) soaking in a moisture saturation condition, (3) adding electrokinetic operations right after the soaking step by converting electrode in the device 13 into anode and the electrode in the device 12 into cathode to remove soluble metal species, and (4) removing soluble forms of metals right after each step of sequential extraction, or removing all soluble metals together after all sequential extraction steps, and (5) further adding complexation agent, soaking, and removal of heavy metal complexes by electrokinetic operations and pumping, wherein the complexation agent comprise humic acids, fulvic acids, nanoparticles of humic substances, EDTA, NTA, CyDTA, DTPA, EDTA-OH, GEDTA, TTHA, Me-EDTA, or a combination thereof, and the humic nanoparticles have a size in a range of 50 to 1000 nm.

* * * * *